(12) United States Patent
Hamer

(10) Patent No.: US 11,906,272 B2
(45) Date of Patent: Feb. 20, 2024

(54) RF ANTENNA PLATFORM

(71) Applicant: STEELROCK TECHNOLOGIES LTD, London (GB)

(72) Inventor: Christopher Hamer, London (GB)

(73) Assignee: STEELROCK TECHNOLOGIES LIMITED, London (GB)

( * ) Notice: Subject to any disclaimer, the term of this patent is extended or adjusted under 35 U.S.C. 154(b) by 456 days.

(21) Appl. No.: 17/293,846

(22) PCT Filed: Nov. 8, 2019

(86) PCT No.: PCT/GB2019/053169
§ 371 (c)(1),
(2) Date: May 13, 2021

(87) PCT Pub. No.: WO2020/099839
PCT Pub. Date: May 22, 2020

(65) Prior Publication Data
US 2022/0011076 A1    Jan. 13, 2022

(30) Foreign Application Priority Data
Nov. 15, 2018  (GB) ...................................... 1818662
May 17, 2019  (GB) ...................................... 1907006

(51) Int. Cl.
*F41H 13/00* (2006.01)
*H01Q 1/12* (2006.01)
*F41G 11/00* (2006.01)

(52) U.S. Cl.
CPC ........... *F41H 13/0075* (2013.01); *H01Q 1/12* (2013.01); *F41G 11/003* (2013.01)

(58) Field of Classification Search
CPC ....... F41H 13/0075; F41H 11/02; H01Q 1/12; H01Q 1/1207; H01Q 1/22; H01Q 1/273;
(Continued)

(56) References Cited

U.S. PATENT DOCUMENTS

| 2007/0165384 | A1* | 7/2007 | Vejnar | G06F 9/454 312/294 |
| 2009/0295618 | A1* | 12/2009 | Beeri | G01S 13/89 342/22 |

FOREIGN PATENT DOCUMENTS

| CN | 106850122 A | * | 6/2017 |
| CN | 106850122 A |   | 6/2017 |

(Continued)

OTHER PUBLICATIONS

International Search Report dated Feb. 12, 2020 for corresponding International Application No. PCT/GB2019/053169.
(Continued)

*Primary Examiner* — Michael Maskell
(74) *Attorney, Agent, or Firm* — TAROLLI, SUNDHEIM, COVELL & TUMMINO L.L.P.

(57) ABSTRACT

An RF antenna platform selectively configurable for portable or non-portable use, the platform comprising: a body comprising at least one RF antenna for transmitting and receiving RF signals; at least one component interface provided on the body for interchangeable mounting of different types of stabilising component to the body; wherein the component interface is common to each of the different types of stabilising component such that the portable and non-portable configurations of the platform are selectively determined by the type of stabilising component mounted to the body.

20 Claims, 25 Drawing Sheets

(58) Field of Classification Search
CPC .............. F41G 11/003; H04K 2203/22; H04K 2203/32; H04K 2203/34; H04K 3/00; H04B 1/0343; H04B 1/0346; F41C 23/00
See application file for complete search history.

(56) References Cited

FOREIGN PATENT DOCUMENTS

| | | | |
|---|---|---|---|
| WO | 2018147604 A1 | 8/2018 | |
| WO | WO-2018147604 A1 * | 8/2018 | .............. F41H 11/02 |

OTHER PUBLICATIONS

UK Search Report dated Mar. 27, 2019 for corresponding GB Application No. 1818662.7.
UK Search Report dated May 6, 2020 for corresponding GB Application No. 1907006.9.

* cited by examiner

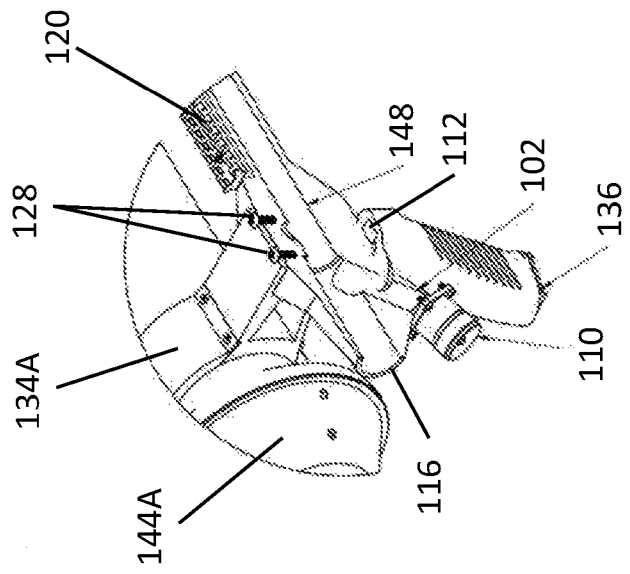
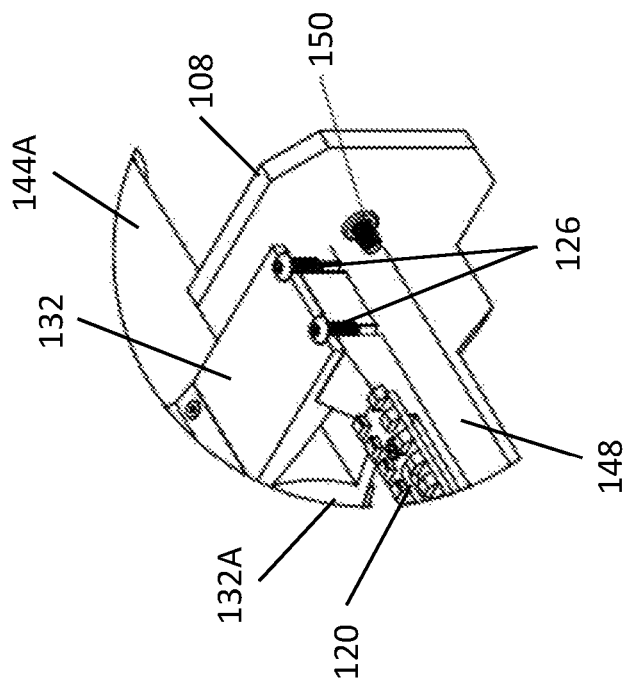

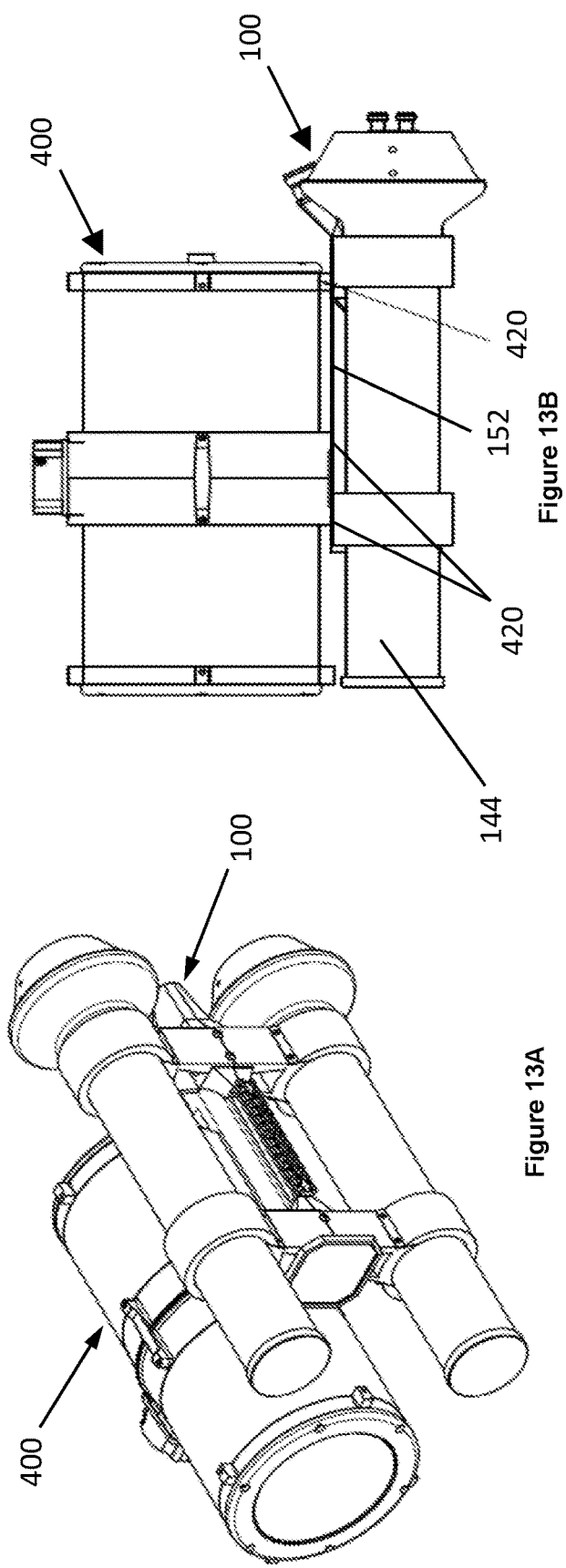

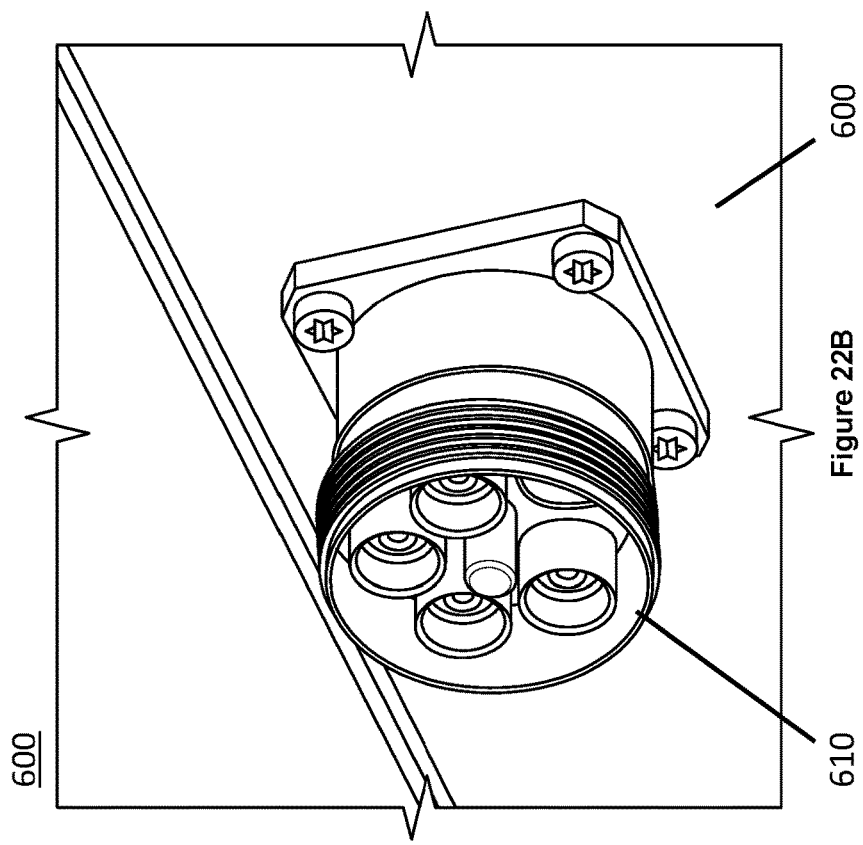
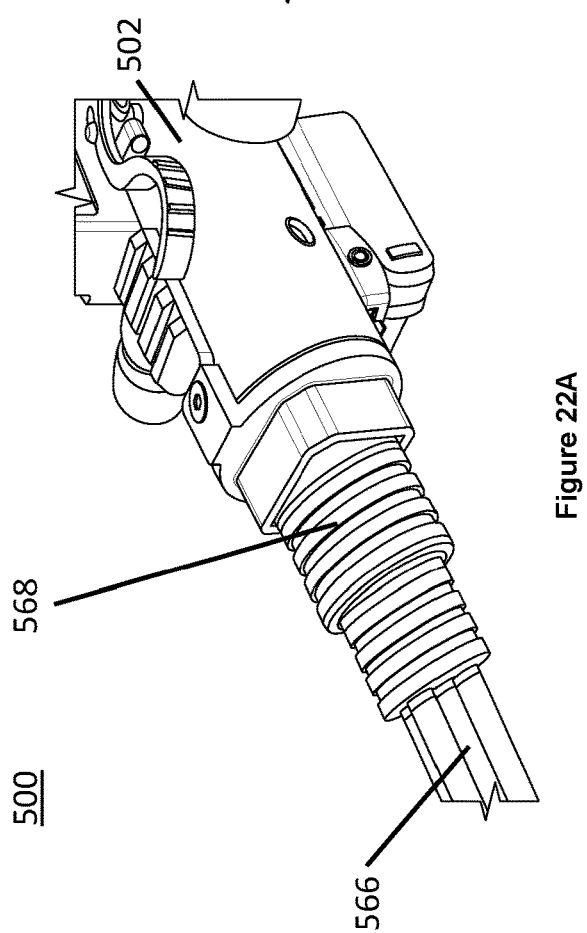

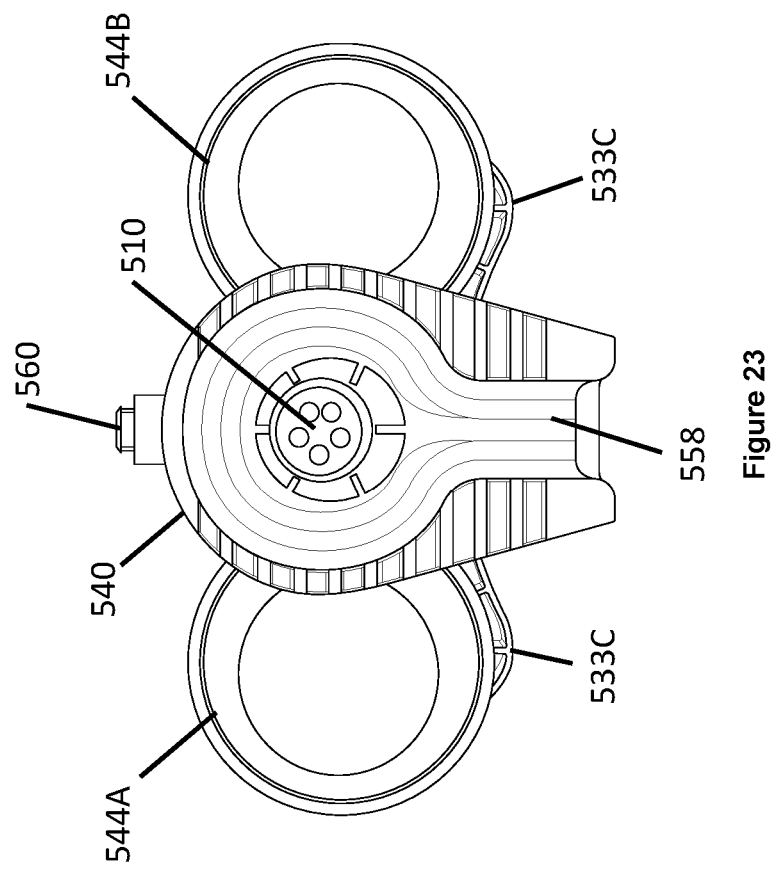

RF ANTENNA PLATFORM

RELATED APPLICATIONS

The present application is a U.S. National Stage application under 35 USC 371 of PCT Application Serial No. PCT/GB2019/053169, filed on 8 Nov. 2019; which claims priority from GB Patent Application No. 1818662.7, filed 15 Nov. 2018, and GB Patent Application No. 1907006.9, filed 17 May 2019, the entirety of each of which are incorporated herein by reference.

The present invention relates to an RF antenna platform, for use with an electronic counter measure (ECM) system.

BACKGROUND TO THE INVENTION

Electronic counter measure (ECM) systems may include one or more RF antennas. Typically, such ECM systems will utilise an antenna array comprising multiple connected RF antennas fed from the same transmitter or receiver, which work together as a single RF antenna to transmit or receive radio waves, thereby achieving higher gain (or directivity) than would typically be possible with a single RF antenna.

Currently, only separate and distinct portable and non-portable ECM systems exist, such systems being designed specifically for only one, or other, of portable use or non-portable use.

In a portable (i.e. "mobile") ECM system of this type, the antenna array may be configured to be "hand-held", though in this context "hand-held" typically means "man-portable", for example where the antenna array is adapted to be supported by the shoulder of an operator to provide mobility.

In a non-portable (i.e. "static") ECM system of this type, the antenna array may be configured for mounting to a static fixture, such as a structure, for example an optical array mounted to a frame or an exterior wall of a building, and the system may be automatically and/or remotely controlled. In this context, a non-portable ECM system also includes a vehicle-mounted antenna array, which allows the ECM system to be somewhat mobile while still being fixedly mounted (e.g. to the vehicle and thus "static").

SUMMARY OF THE INVENTION

Described herein is an RF antenna platform selectively configurable for portable or non-portable use, the platform comprising: a body comprising at least one RF antenna for transmitting and receiving RF signals; and at least one component interface provided on the body for interchangeable mounting of different types of stabilising component to the body; wherein the component interface is common to each of the different types of stabilising component such that the portable and non-portable configurations of the platform are selectively determined by the type of stabilising component mounted to the body.

The present invention provides an RF antenna platform, which can selectively be configured between portable and non-portable configurations. To facilitate the selective configurations, the platform comprises a component interface that is common to the stabilising components that are selectively mounted to the platform to configure it for either portable use (e.g. man-operated) or non-portable use (e.g. integration into a pan-and-tilt electro-optical array).

The different types of stabilising component may include a hand-grip for configuring the platform for portable use, for example a pistol-type hand-grip. Alternatively, or additionally, the different types of stabilising component may include a static fixture for configuring the platform for non-portable use. Furthermore, the different types of stabilising component may include a rotatable mount for configuring the platform for non-portable use, preferably said rotatable mount being attached to a static fixture such as a building or vehicle, for example wherein rotation of the rotatable mount is motorised. The different types of stabilising component may further include a mounting plate for configuring the platform for non-portable use, for example wherein the mounting plate is adapted for mounting the platform to a static fixture and/or wherein the mounting plate has a slot for receiving fixings of the static fixture. The body of the platform may be elongate, having a first (rear) end and a second (front) end, spaced apart, preferably wherein said at least one component interface is provided at the first end of the body and said at least one RF antenna is provided at the second end of the body.

Preferably, the at least one component interface is a first component interface, with the platform further comprising a second component interface for interchangeable attachment of said different types of stabilising component. The second component interface may be spaced apart from said first component interface on the body, preferably on a common side of the body, for example wherein the first component interface is provided at a first end of the body and the second component interface is provided at a second end of the body.

As mentioned above, the different types of stabilising component may include one or more hand-grips, which may include a first hand-grip, for example a pistol-type hand grip, for mounting to the first component interface and a second hand-grip, for example a fore-grip, for mounting to the second component interface, together configuring the platform for portable use.

The platform may further comprise at least one of said stabilising component(s) removably mounted to said at least one component interface.

Thus, the platform may readily be configured for "plug-and-play" mounting onto the side of a static fixture comprising an optical array, for example, simply by mounting to the component interface the appropriate type of stabilising component for non-portable use that enables the platform to be mounted with the static fixture. To reconfigure the platform for portable use, said stabilising component can be detached and one or more different types of stabilising component, for example hand-grips, may be mounted to the component interface. The hand-grips may comprise a pistol-type hand-grip and/or a fore-grip, such that the platform is thereby configured for portable use. In this portable configuration, the platform may be readily configured, preferably via quick-release attachment of the hand-grips to resemble a conventional "weapons" platform, to provide mobility of the platform.

The body (of the platform) may further be configured for attachment of a support component for supporting the platform on part of an operator's body, for example a shoulder butt. The support component may include a shoulder stock or butt.

The at least one RF antenna is, preferably, configured as a flat panel RF antenna. The least one RF antenna may be integral (or integrally formed) with the body, for example wherein said at least one RF antenna is a fixed RF antenna. The at least one RF antenna is preferably arranged to be forward-facing, in use. The at least one RF antenna preferably serves a dual function both as receiver of data (e.g. from a separate control unit to which the platform is connected, in use) and transmitter of an "effector" frequency band (controlled by said control unit). The at least one RF antenna may be a single frequency antenna. The at least one RF antenna may be configured to be linearly polarised.

The platform may further comprise a data interface for connecting said at least one RF antenna to a separate control unit. The data interface may comprise a 5-in-1 connector arrangement such that five data cables can be connected to the platform for data communication with the at least one RF antenna via said single connector. An internal conduit may be provided through the body for communication of RF data between the data interface and said at least one RF antenna, for example wherein at least part of the body is hollow. Communication of RF data may be performed by electromagnetically shielded cabling (EMC), preferably wherein the cabling is substantially contained within the body. The data interface may therefore provide an RF signal interface with more than one RF signal channels contained within a single RF connector (e.g. plug and socket arrangement). Additionally, or alternatively, the data interface may be configured for quick release with an RF connector with one or more RF signal channels.

The platform may further comprise at least one antenna mount for mounting to the body at least one (further) RF antenna configured to transmit RF signals. The (further) RF antenna is preferably detachably mountable such that it may be referred to as a "detachable" RF antenna. The at least one detachable RF antenna may be configured to form an antenna array with said at least one, preferably flat panel, RF antenna (described above), which may, in contrast to the "detachable" RF antenna, be referred to herein as a "fixed" RF antenna. The at least one (e.g. "fixed") RF antenna may be disconnected to allow only the "detachable" RF antennas to be operated, while remaining as part of the platform.

The at least one antenna mount may be arranged to mount to the body at least two "detachable" RF antennas configured to transmit RF signals, preferably whereby said at least two detachable RF antennas can form an antenna array with said at least one ("fixed") RF antenna. The at least one antenna mount may comprise first and second antenna mounts for mounting the or each detachable RF antenna, preferably wherein the first and second antenna mounts are spaced apart along the body such that said at least one detachable RF antenna is supported (i.e. when mounted thereto) by both the first and second antenna mounts. This arrangement may be referred to herein as "dual" antenna mounts. The at least one antenna mount may comprise a clamp or bracket arranged to secure said at least one detachable RF antenna (to the platform).

The "detachable" RF antennas may act as RF signal transmitters for the (remaining) "effector" frequency bands (not covered by the "fixed" RF antenna) that the control unit may be configured to transmit. Together, all of the RF antennas may form an "antenna array", which may be configured as an "endfire" array in which the direction of radiation is along the line of the RF antennas, which is preferably forward-facing, in use. The platform may further comprise at least one of said detachable RF antenna. The at least one detachable RF antenna preferably comprises a helical RF antenna. The "detachable" antennas may be configured to be left-hand and right-hand polarised helical antennas, respectively. The "antenna array" may therefore comprise a multi-band helical and flat panel antenna array with verified directional performance for precision effects. The antennas may be directional antennas. The use of multiple RF antennas in an "antenna array" also provides the advantage of spreading the frequency load of harmonics.

The platform may further comprise at least one RF connector port provided in the body and coupled with the communication interface, wherein the at least one RF connector port is further arranged to be coupled to the at least one detachable RF antenna for communication of RF data therebetween, for example wherein the at least one detachable RF antenna and/or said at least one RF connector port comprises a SubMiniature version A (SMA) connector. This may provide a convenient arrangement that simplifies the amount of different cabling required to connect the detachable RF antennas to a control unit, especially if combined with a data interface comprising a 5-in-1 connector, as mentioned above, thereby helping to facilitate the "plug-and-play" aspect of the platform.

The body is preferably formed from a material configured to inhibit conduction of radio frequency (RF) signals, for example wherein the material comprises Kevlar™' and/or wherein the body comprises NylonX™ polymer.

The platform may further comprise an attachment (or sensor) mount for mounting an optical accessory to the body, for example a magnifying scope or optical sighting system, preferably wherein the attachment member is an attachment rail, for example a Picatinny rail or a Weaver rail.

Thus, the platform may facilitate the mounting of at least one RF antenna in a forward-facing direction, i.e. facing in a direction towards the front end of the platform. The platform may facilitate the mounting of at least one RF antenna co-axially with the body of the platform. The platform may further facilitate the mounting of at least one RF antenna par-axially with the platform body. Alternatively, or additionally, the platform may facilitate the mounting of at least one RF antenna par-axially with one or more other RF antennas.

Also provided is an apparatus (or system), comprising: a platform as described herein; and at least one detachable RF antenna (e.g. as described herein) mounted to said platform. The at least one detachable RF antenna may be a helical RF antenna.

Also provided is a kit of parts, comprising: a platform as described herein; and at least one stabilising component (e.g. as described herein) that is (preferably, removably) mountable to the platform to configure the platform for (at least one of) portable or non-portable use. Preferably, the kit of parts may comprise a plurality (i.e. two or more) of different types of stabilising components that can be interchangeably mounted to the platform selectively to configure the platform for portable or non-portable use. The kit of parts may also include one or more detachable RF antennas (e.g. as described herein). The kit of parts may also include one or more antenna mounts (e.g. as described herein). The kit of parts may also include one or more optical accessory (e.g. as described herein).

Advantages provided by the present invention include: agility and flexibility in the range of applications of the technology; efficiency improvement and cost-reduction in terms of having a common (or "universal") platform for both portable and non-portable applications; operational speed and ease of use in all applications thanks to a "quick-release" mounting arrangement comprising a component interface that is common to the different types of stabilising component for both portable and non-portable configurations, especially when switching between configurations; improvements in manufacturing and operational efficiency by reducing peripheral components (for example, throw mounts, picatinny rails, etc.) and a reduction in weight, manufacturing complexity and cost. Furthermore, the platform can provide a convenient "plug-and-play" connection with a separate control unit for communication of RF data and control signals, for example, which can increase the speed at which the platform can be switched between configurations.

Thus, the present invention provides a secure, robust, ruggedised mounting platform for an antenna array, built around a body having at least one component interface configured for quick-release of the respective, interchangeable, stabilising component(s) for portable and non-portable configurations such that the platform can be quickly and easily reconfigured for a particular application, when required.

As used herein, the term "component interface" preferably connotes a mounting arrangement, including a dedicated surface on the body, to which the different types of stabilising component are interchangeably mounted. As used herein, the term "common to" preferably connotes that different types of stabilising component are interchangeably mounted to the same component interface(s) according to the desired configuration of the platform. As used herein, the term "non-portable" preferably connotes a configuration whereby the platform is mounted to a building, vehicle or other structure and is therefore not hand-held by an operator. As used herein, the term "portable" preferably connotes a configuration whereby the platform is portable, preferably wherein the platform can be hand-held or otherwise carried by an operator. As used herein, the term "effector frequency band" preferably connotes an RF frequency band of a known bandwidth.

FIGURES

Some preferred embodiments of the present invention will now be described in detail, by way of example only, with reference to the following figures, in which:

FIGS. 7A and 7B show different aspects of the platform in FIG. 6;

FIGS. 13A to 13C show the platform according to the first embodiment in a non-portable configuration mounted to a static fixture comprising an optical array;

FIGS. 22A and 22B show a data interface of a separate control unit for supplying RF signals to a platform according to the present invention;

FIG. 23 shows an end-view of the platform according to the fourth embodiment having a detachable butt mounted thereto;

DETAILED DESCRIPTION

Figure 1:
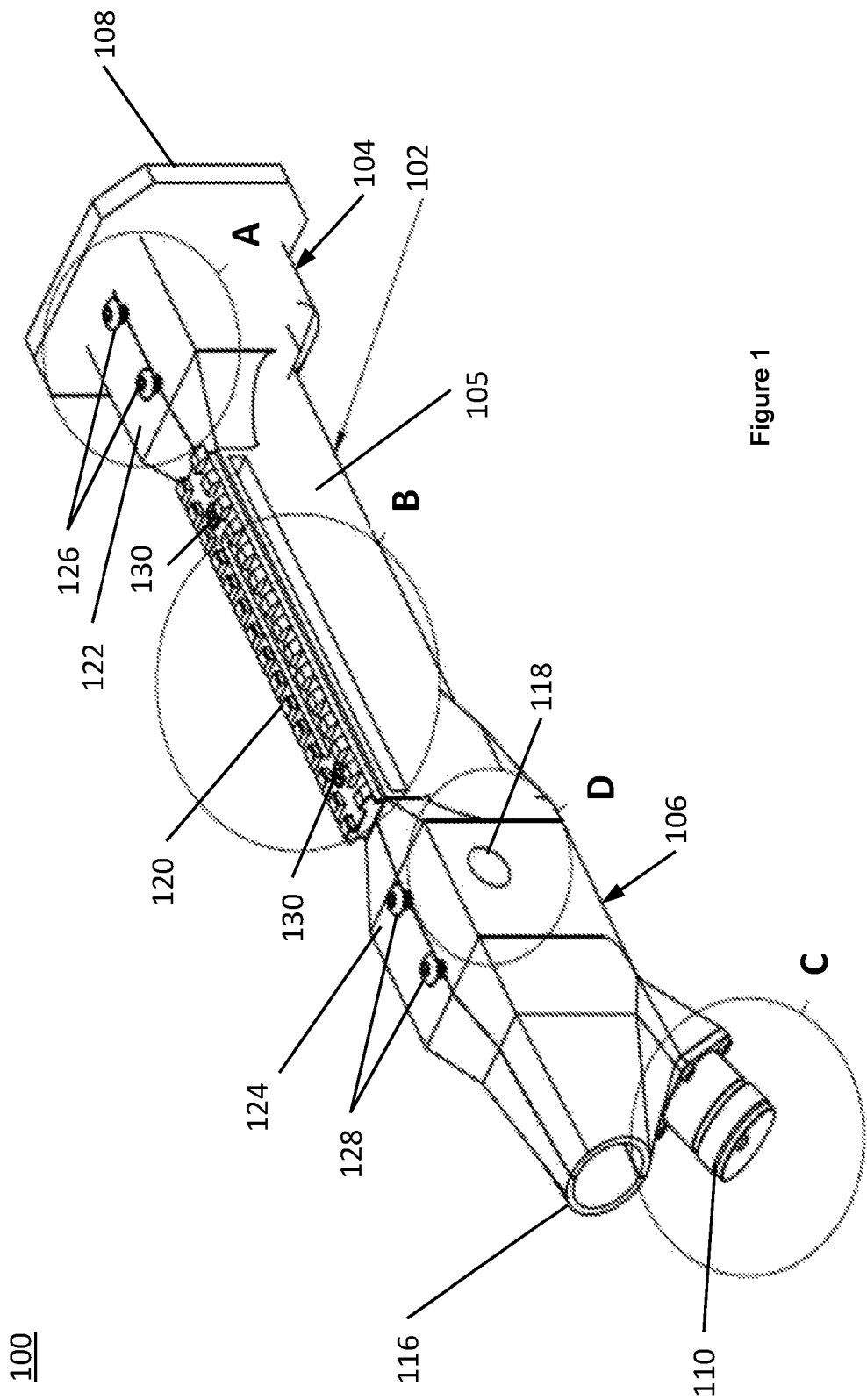
FIG. 1 shows an RF antenna platform according to a first embodiment of the present invention.

In the following description and accompanying drawings, corresponding features of different embodiments are, preferably, identified using corresponding reference numerals.

An RF antenna platform 100 according to a first embodiment is shown in FIG. 1. The platform 100 comprises a body 102. The body 102 is elongate with a first (or "rear") end 106 and a second (or "front") end 104. A central portion 105 of the body 102 connects between the first and second ends 106, 104. The central portion 105 may be narrower than the first and second ends 104, 106, as shown. The width of the central portion 105 may correspond generally to the width of an attachment rail 120 (discussed below) provided on the central portion 105.

The body 102 is ideally formed from a material configured to inhibit conduction of radio frequency (RF) signals. For example, the body 102 may comprise the polymer NylonX™. Additionally, or alternatively, the body 102 may comprise Kevlar™.

An RF antenna 108 is provided at the front end 104 of the body 102 such that, in use, the RF antenna 108 is forward-facing. The RF antenna 108 is configured both to transmit and receive RF signals. The RF antenna 108 here is a "flat panel" RF antenna. The RF antenna 108 is shown as an integral part of the body 102, and may therefore be referred to herein as a "fixed" antenna 108. In other embodiments (not shown), the antenna 108 may be a separate component that can be attached or otherwise secured to the body 102. The RF antenna 108 may also have a different physical configuration to that of a "flat panel" RF antenna.

At the rear end 106 of the body 102 is provided a data interface 110 for connecting the platform 100 to a separate control unit (not shown). The data interface 110 is secured to the body via screw fixings. The data interface 110 is in data communication with the RF antenna 108. The body 102 is at least partially hollow, including the central portion 105 of the body 102. An internal conduit is thereby provided through the body 102 for communication of RF data between the RF antenna 108 and data interface 110. The communication of RF data is via cabling (not shown)

disposed within the internal conduit of the body 102. The cabling is, preferably, electromagnetically (EMC) shielded.

A first "rear" component interface 112 (not shown in FIG. 1) is provided for interchangeable attachment (e.g. quick-release) of a plurality of stabilising components. The first component interface 112 is located towards the first ("rear") end 106 of the body 102, on the underside of the body 102

A second "front" component interface 114 (not shown in FIG. 1) is provided for interchangeable attachment of a second plurality of stabilising components. The second component interface 114 is located towards the second ("front") end of the body 102, on the underside of the body 102. The second component interface 114 in this embodiment is located on the body 102 towards the fixed antenna 108.

The component interfaces 112, 114 are common (or "universal") to the different types of stabilising component that may be mounted to the body 102. The type of stabilising component mounted to the component interface(s) 112, 114 determines the configuration of the platform 100. In other words, whether the platform 100 is configured for portable or non-portable use depends on the type of stabilising component mounted to the component interface(s) 112, 114 at a particular time. The stabilising components being "interchangeable" means that only one type of stabilising component should be mounted to the platform 100 at any one time.

For example, one type of stabilising component includes one or more hand-grips, such as a pistol-type grip and a fore-grip mounted to the component interfaces 112, 114 at the rear and front ends 104, 106 of the body, respectively, to configure the platform 100 for portable use (e.g. such it can be hand-held by an operator). Of course, depending on the design of the platform 100, only a single stabilising component, in the form of a pistol-type hand-grip for example, may be mounted to the platform 100. By providing for two hand-grips to be mounted as stabilising components, however, the platform 100 can be better stabilised by an operator, in use.

A different type of stabilising component may be mounted to the component interface 112, 114 to adapt the platform 100 for mounting with part of a static fixture, such as a rotatable mount (e.g. fixed pan-and-tilt harmonic drive housing) that forms part of an optical array. In such a configuration, the platform 100 is configured for non-portable use. The optical array may in turn be mounted to a structure (such as a building) or to a vehicle whereby rotation may be motorised, and optionally automated and/or remotely controlled. Of course, it will be appreciated that a static fixture itself may also be considered to be a stabilising component, if mounted directly to the platform via the component interface(s) 112, 114.

The different types of component interface 112 will be described in more detail further on.

A support mount 116 is provided at the rear of the body 102. The support mount 116 is configured for removable attachment of a support component for portable use, as will be discussed further on.

Also provided on the upper side of the body 102 are landing surfaces 122, 124 for antenna mounts (described further on) for mounting to the body 102 at least one detachable RF antenna (not shown). As shown in FIG. 2A, the landing surfaces 122, 124 are spaced apart along the body 102, with a first "rear" landing surface 124 provided on the upper side of the body 102 proximate to the rear end 106 of the body 102, and a second "front" landing surface 122 provided on the upper side of the body 102 proximate to the front end 104 of the body 102. Each landing surface 122, 124 is provided with fasteners 126, 128, for securing the antenna mounts to the body 102. The front landing surface 122 and fasteners 126 are shown in the close-up of FIG. 2A. The fasteners 126 in this embodiment are in the form of a pair of screws that secure into the body 102 thereby to secure an antenna mount to the body 102.

Figure 2B:
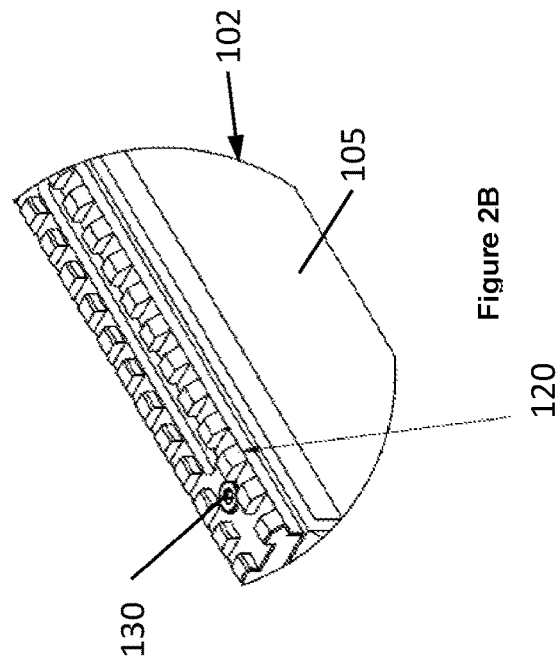
FIGS. 2A to 2D show various aspects of the platform of FIG. 1.

FIG. 2B shows a universal attachment (or sensor) mounting rail 120 for mounting an optical accessory (not shown), or other sensor, to the body 102. The attachment rail 120 mounted to the upper side of the body 102, along the central portion 105 of the body 102. The attachment rail 120 may be detached from the body 102 if required, by removal of securing screws 130. The attachment rail 120 may be a Picatinny rail or a Weaver rail, for example. The optical accessory may be a magnifying scope or an optical sighting system, for example.

Figure 2D:
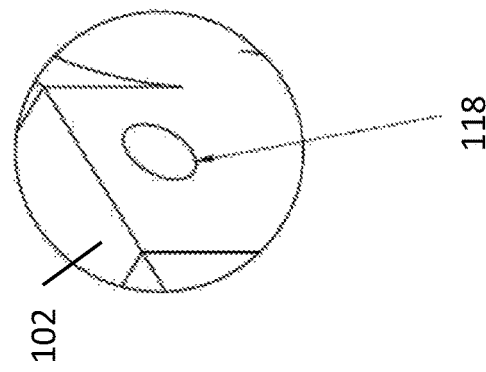
Figure 2A:
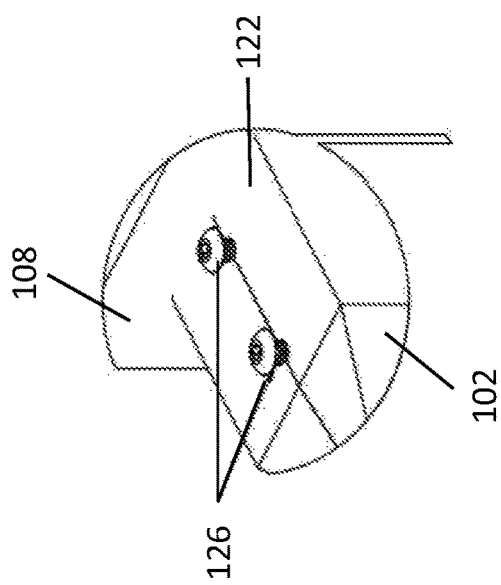
Figure 2C:
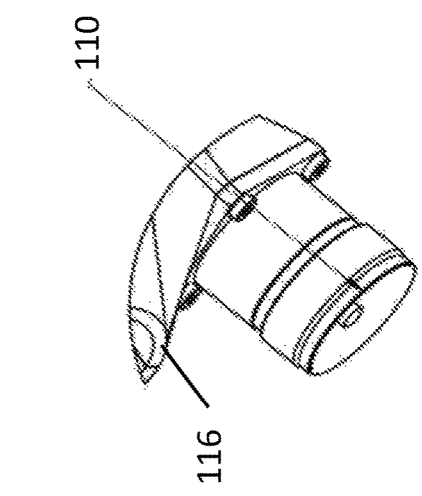

The data interface 110 is shown in FIG. 2C in the form of a connector (such as a plug or similar). The connector 110 is preferably a 5-in-1 connector, which is designed to carry up to five separate data cables in a single, "plug and play" configuration. In use, a corresponding connector (e.g. a receptacle for the plug) that is connected to a separate control unit (not shown) can be coupled with the connector 110 such that data can be communicated between the platform 100 and the control unit. Cabling that connects the data interface 110 with the RF antenna 108 may be disposed internal of the body 102, preferably within an internal conduit (not shown) inside the body 102. As such, the connector 110 may be configured to connect to each RF antenna mounted to the platform 100 for transmission of RF data and control signals therebetween.

A connector port 118 located in the side of the body 102 is shown in FIG. 2D. The connector port 118 is configured to be coupled to a corresponding connector on a detachable RF antenna (described further on). For example, the connector on the detachable RF antenna may comprise a Sub-Miniature version A (SMA) connector. A suitable cable that is configured to couple the connector port 118 to the connector on the detachable RF antenna will be required, in use, and such cables are well known in the art. A similar connector port 118 may be provided on the opposing side of the body 102 for a second detachable RF antenna. Further connector ports (not shown) may be provided if more than two detachable RF antennas are to be mounted to the platform 100. The connector port 118 is in data communication with the data interface 110 at the rear end 106 of the body 102. Cabling that connects the connector port 118 with the data interface 110 may be disposed internal of the body 102, preferably within an internal conduit (not shown) inside the body 102.

Figure 3:
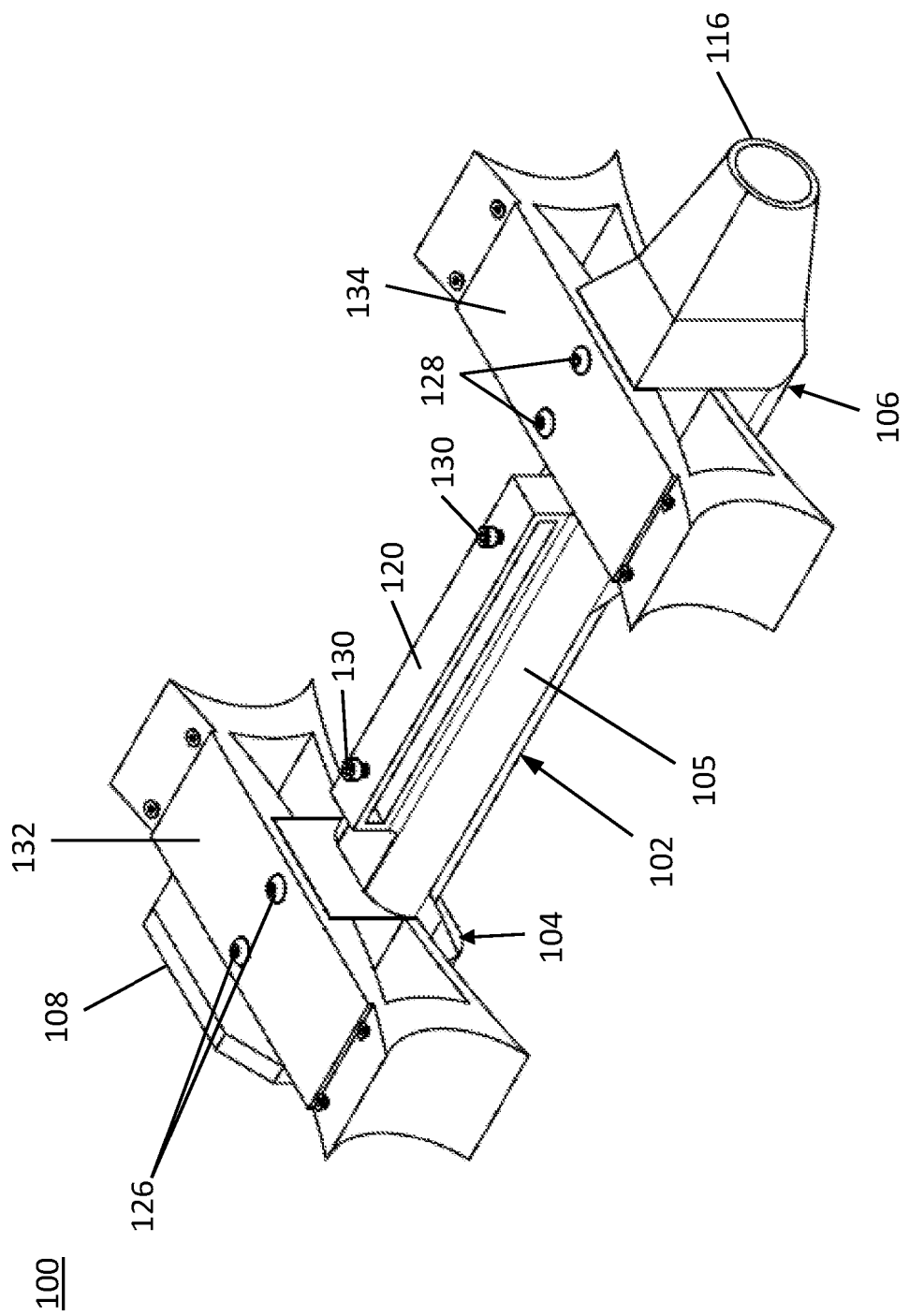
FIG. 3 shows the platform having dual antenna mounts for mounting two detachable RF antennas.

The antenna mounts 132, 134 mentioned above can be seen in FIG. 3. First and second antenna mounts 132, 134, respectively, are secured to the front and rear landing surfaces 122, 124 on the body 102 via the fasteners 126, 128. In this configuration, the antenna mounts 132, 134 enable two detachable RF antennas to be mounted to the platform 100. At least one antenna mount is required if a detachable RF antenna is to be mounted to the platform 100. Depending on whether the detachable RF antenna is a "low gain" (short) or "high gain" (long) antenna, it may be preferable to have two (i.e. "dual") antenna mounts 132, 134, as shown, for enhanced security of a detachable RF antenna when mounted to the body 102. The antenna mounts 132, 134 are preferably spaced apart, and located towards both the front and rear ends 104, 106, respectively, of the body 102 such that a detachable RF antenna is supported by an antenna mount 132, 134 at two different places along its length.

Figure 4:
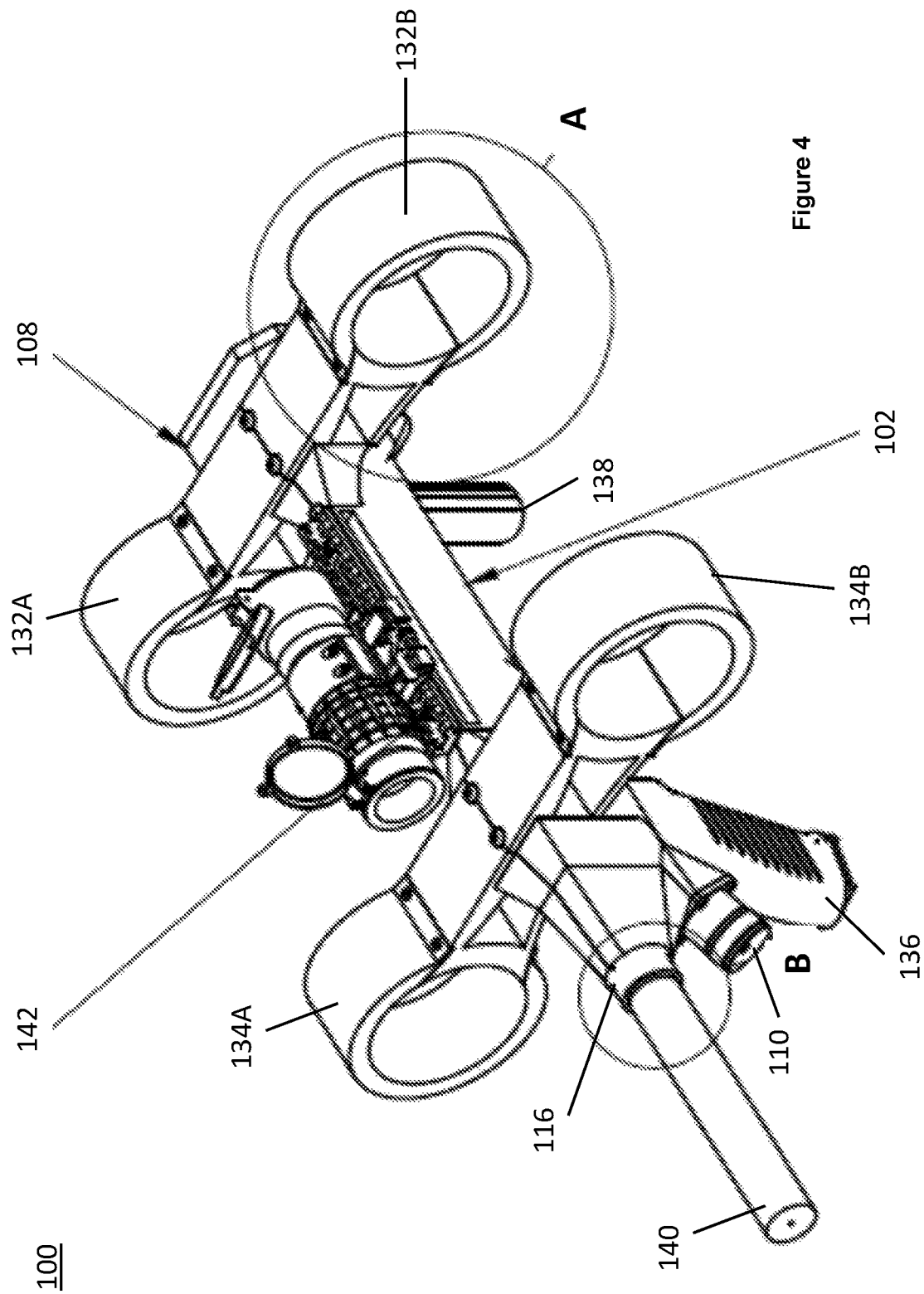
FIG. 4 shows the platform having stabilising components mounted to configure the platform for portable use.

As shown in FIG. 4, each antenna mount 132, 134 may further comprise an antenna clamp 132A, 132B; 134A, 134B arranged to be secured to a detachable RF antenna. The first antenna clamps 132A, 132B are arranged one on either side of the body 102 such that they are generally opposed. Similarly, the second antenna clamps 134A, 134B are arranged one on either side of the body 102 such that they are generally opposed.

In use, the antenna clamps 132A, 132B; 134A, 134B encompass or surround a portion of a detachable RF antenna, which is preferably cylindrical, thereby to secure it to the body 102. Other securing arrangements are of course possible, and may include one or more brackets, or similar component(s).

As shown in FIG. 4, the platform 100 has a stabilising component 136, 138 attached to each of the component interfaces 112, 114 for configuring the platform 100 for "hand-held" portable use. A first stabilising component 136 in the form of a detachable hand-grip (e.g. a "pistol-type" grip) is attached to the first component interface 112 located towards the rear end 106 of the body 102. A second stabilising component 138 in the form of a detachable hand-grip (e.g. a forward grip or "fore-grip") is attached to the second component interface 114 located towards the front end 104 of the body 102.

A detachable support component 140 (e.g. a shoulder butt or stock) is mounted to the support mount 116 at the rear end of the body 102 for supporting the platform 100 on or against the shoulder of an operator's body, in use, while the operator holds the hand-grip(s). This arrangement further improves stability of the platform 100 when in the portable configuration.

An optical accessory 142 is mounted to an attachment mount 120. As mentioned before, the optical accessory 142 may be an optical sight or magnifying scope, for example.

Figure 5B:
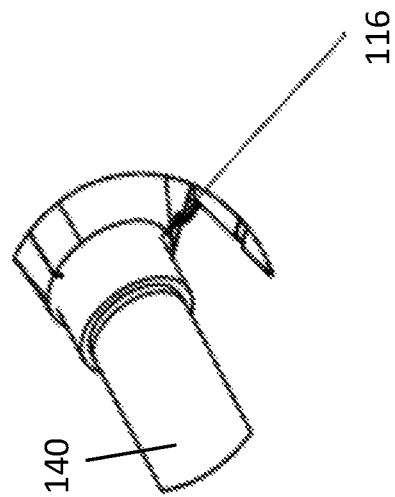
FIGS. 5A and 5B show different aspects of the platform in FIG. 4.
Figure 5A:
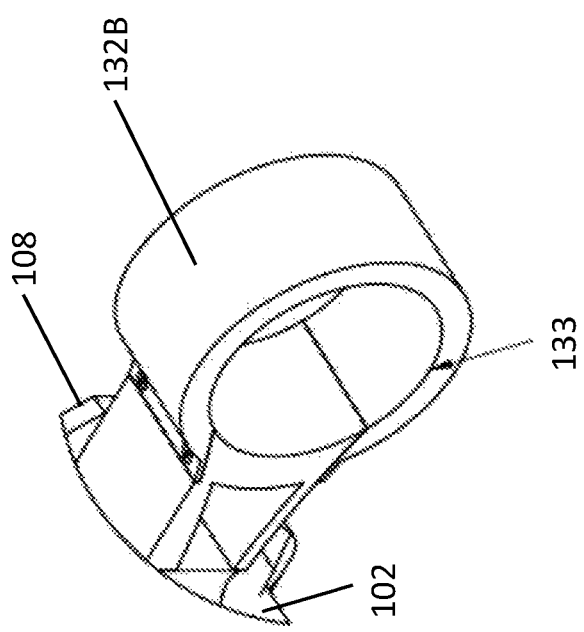

FIGS. 5A and 5B show close-up views of an antenna mount 132B and the support mount 116, respectively, as shown in FIG. 4. The antenna clamp 132B comprises a circular bracket 133 arranged to be fastened around a portion of a detachable RF antenna. The antenna clamp 132B may be opened to receive the detachable RF antenna and then secured closed by screws or other suitable fasteners. The antenna mounts 132, 134 are preferably formed from the same material as the body 102. In an alternative embodiment (not shown) the antenna mounts 132, 134 may be integrally formed with the body 102.

FIG. 5B shows a portion of the support component 140 extending from the support mount 116 provided at the rear of the body 102. As mentioned previously, the support component 140 may take the form of a shoulder stock (or butt). The support component 140 may be mounted to the platform 100 via a quarter-turn screwed arrangement into the support mount 116, or by means of a push-in clip locking arrangement, for example. The support member 140 may not be required when the platform 100 is configured for non-portable use.

Figure 6:
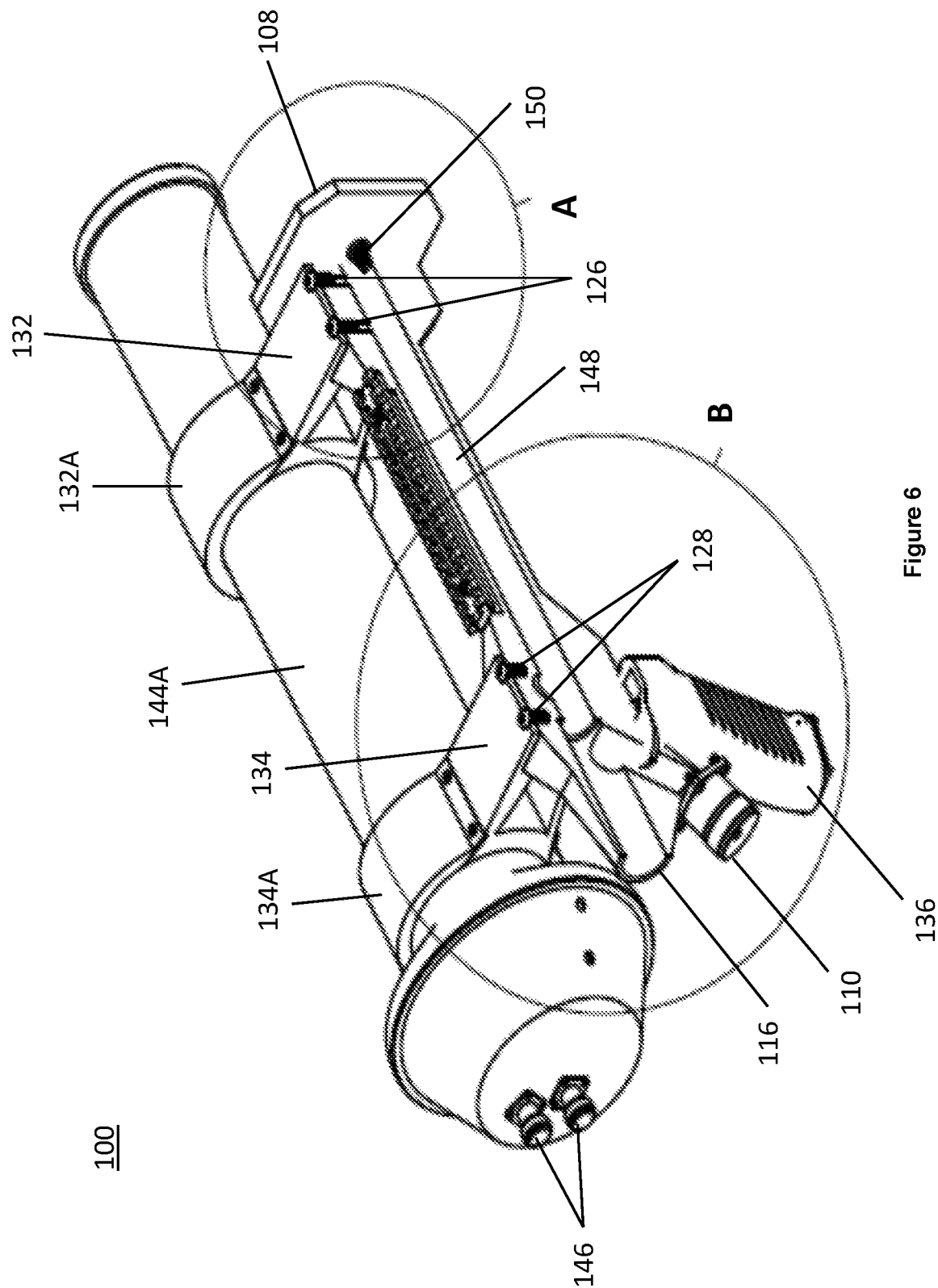
FIG. 6 shows a sectional view of the platform with a detachable RF antenna mounted.

As mentioned above, one or more, preferably helical, RF antennas 144 may be detachably mountable on either side of the platform 100. FIG. 6 shows a detachable RF antenna 144 mounted to the platform via an antenna mount 132A. The detachable RF antenna 144 is preferably a helical RF antenna, having a cylindrical shape. The detachable RF antennas 144 may be configured to transmit RF signals in an "effector" frequency band. The detachable RF antenna 144 has a pair of external RF connectors 146 for coupling the detachable RF antenna 144 to the body 102 via the connector ports 118 provided on the body 102, as described above. The external RF connectors 146 are, preferably, SubMiniature version A (SMA) connectors, though other types of RF connector may be used. The RF connectors 146 of each detachable RF antenna are coupled to a respective connector port 118, provided on either side of the body 102 using a suitable RF cable. The RF connector port 118 may (also) be configured for SMA connectors. When coupled to a connector port 118, the detachable RF antenna 144 is thereby in data communication with the data interface 110 of the platform 100, and hence also with a control unit (or other suitable control system) to which the data interface 110 is connected, in use.

The cut-away view of the platform 100 in FIG. 6 also shows the internal conduit 148 for cabling (not shown) to connect the RF antenna 108 to the data interface 110, as mentioned above. The internal conduit 148 extends substantially the length of the body 102 thereby providing routing for the cabling between the RF antenna 108 and the data interface 110. The body 102 is therefore at least partially hollow to provide the internal conduit 148. An internal RF connector 150 of the fixed RF antenna 108 is also shown, to which the cabling is coupled. Similar to the detachable RF antennas 144, the internal RF connector 150 of the fixed RF antenna 108 may be an SMA connector. The internal conduit 148 is, preferably, substantially cylindrical as shown, to provide optimum strength and/or rigidity of the body 102.

It can also be seen that the "fixed" RF antenna 108, is forward-facing, in use, and may be formed as an integral part of the body 102. As mentioned above, providing the RF antenna 108 at the front end 104 of the body 102 allows it to serve a dual function both as receiver of data for threat assessment (e.g. by the separate control unit to which the platform is connected, in use) and transmitter of an "effector" frequency band. The detachable RF antenna 144 is also forward-facing, in use. In other words, the fixed RF antenna 108 and the one or more detachable RF antennas 144, which are preferably configured to form an antenna array, are arranged both to point in the same direction, in use.

FIGS. 7A and 7B show close-up cut-away views of the front end 106 and the rear end 106 of the platform 100, respectively, as shown in FIG. 6. FIG. 7A shows the RF antenna 108 being integral to the body 102. The internal RF connector 150 of the fixed RF antenna 108 is shown protruding into the internal conduit 148 at the front end 104 of the body 102 for coupling (via suitable RF cabling) to the data interface 110 located at the rear end 106 of the platform 100. A first antenna mount 132A is also shown secured to the body 102 via fasteners 126. FIG. 7B shows the rear end 106 of the body 102, including the data interface 110 and a stabilising component, in the form of a pistol-type hand grip, 136 attached to the first component interface 112. A second antenna mount 134 is also shown secured to the body 102 via fasteners 128. A detachable RF antenna 144A can be seen mounted to the body 102 via first and second antenna clamps 132A, 134A.

Figure 8:
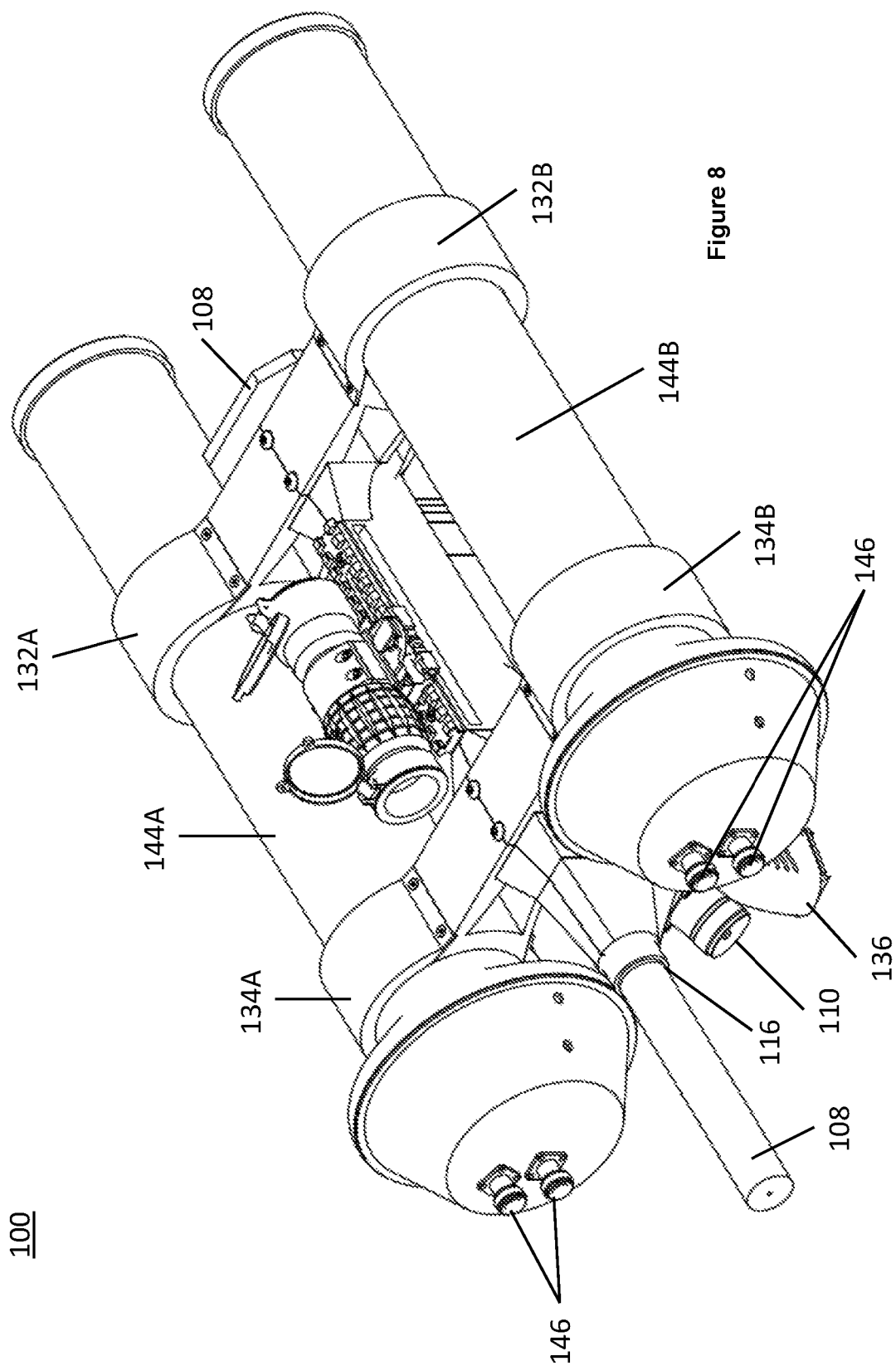
FIG. 8 shows the platform with two detachable RF antennas mounted to form an antenna array.

It will be appreciated that, while only one detachable RF antenna 144 may be provided, two (or more) detachable RF antennas 144 may be provided to form an antenna array depending on the desired application for the platform 100 and the effector frequency bands required to be transmitted by the control unit, in use. The body 102 can therefore be configured to have a corresponding number of antenna mounts 132, 134 for mounting the "detachable" RF antenna 144. In a preferred embodiment, shown in FIG. 8, the platform 100 is configured for portable use with two detachable RF antennas 144 mounted to the body 102 via the antenna mounts 132, 134. The two detachable RF antennas 144A, 144B shown are "twin" helical RF antennas, having a cylindrical shape, and can each be configured to transmit RF signals across different effector frequency bands depending on the desired use and configuration of the platform 100.

Figure 9:
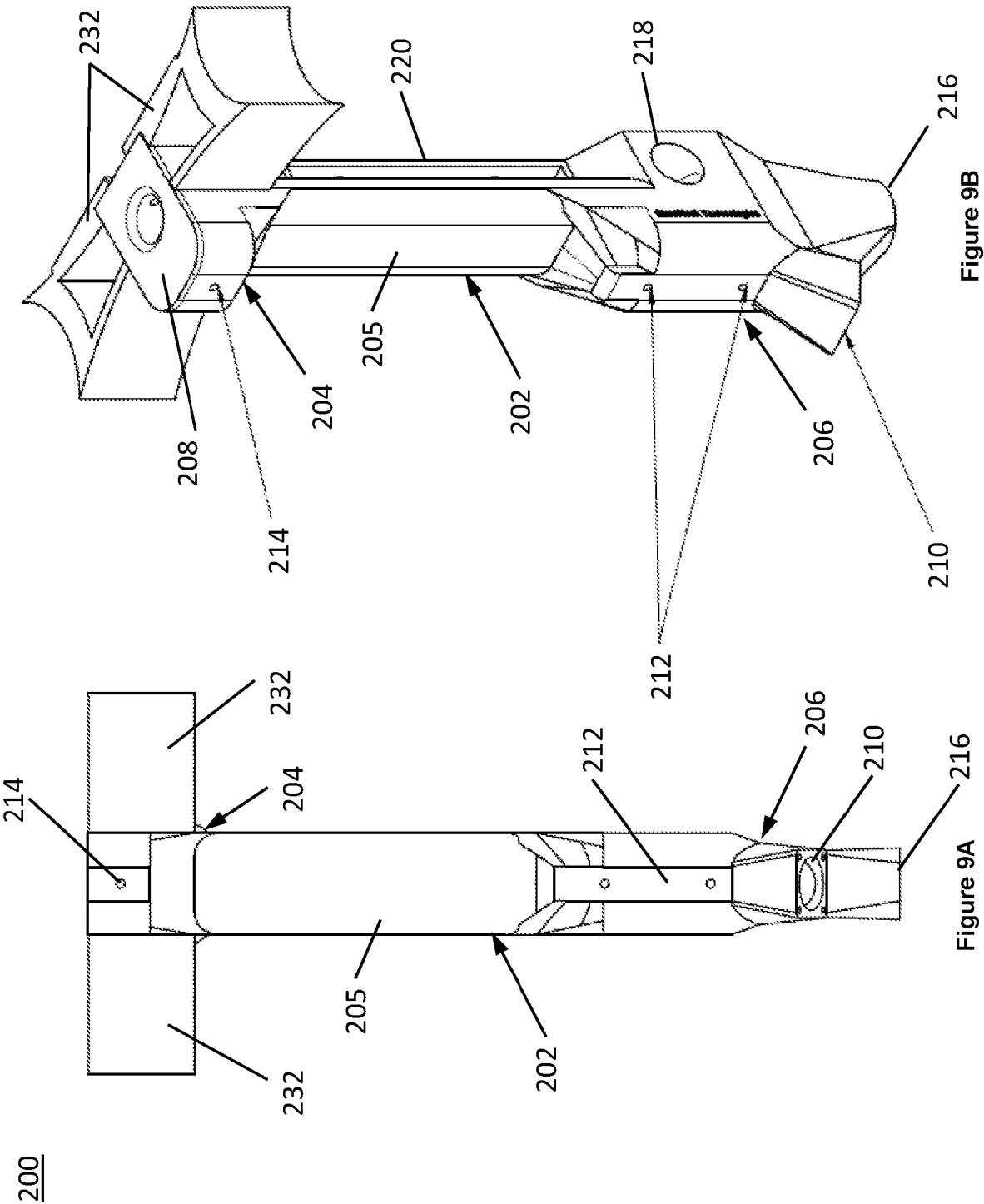
FIGS. 9A and 9B show an RF antenna platform according to a second embodiment of the present invention.

A second embodiment of an RF antenna platform 200 is shown in FIGS. 9A and 9B. This platform 200 is designed for low gain (short) detachable RF antennas 244, and therefore has only a single antenna mount 232 provided at the front end 204 of the body 202.

Similar to the platform 100 of the first embodiment, this platform 200 has a data interface 210 for coupling with a separate control unit (not shown). The platform 200 also has connector ports 218 in the side of the body 202 for coupling detachable RF antennas 244 mounted to the platform 200, via the antenna mount 232, to the data interface 210 for communication therebetween.

The underside of the body 202 is shown in both FIGS. 9A and 9B, and thus the component interfaces 212, 214, to which the different types of stabilising component are interchangeably mounted, are clearly visible. Each component interface 212, 214 is provided with screw holes for the attachment of the respective stabilising components. In this embodiment, the rear component interface 212 is provided with a pair of screw holes, and the front component interface 214 is provided with a single screw hole. The component interfaces of other embodiments may be provided with similar arrangements of screw holes, though the number and positon of screw holes at each component interface may vary according to the particular design and intended application of the respective platform. It will also be recognised that screw holes are simply a preferred means of fastening the stabilising components for "quick-release" to the platforms. Other suitable arrangements for releasable mounting of stabilising components may be possible, as will be readily understood by a skilled person.

Figure 10:
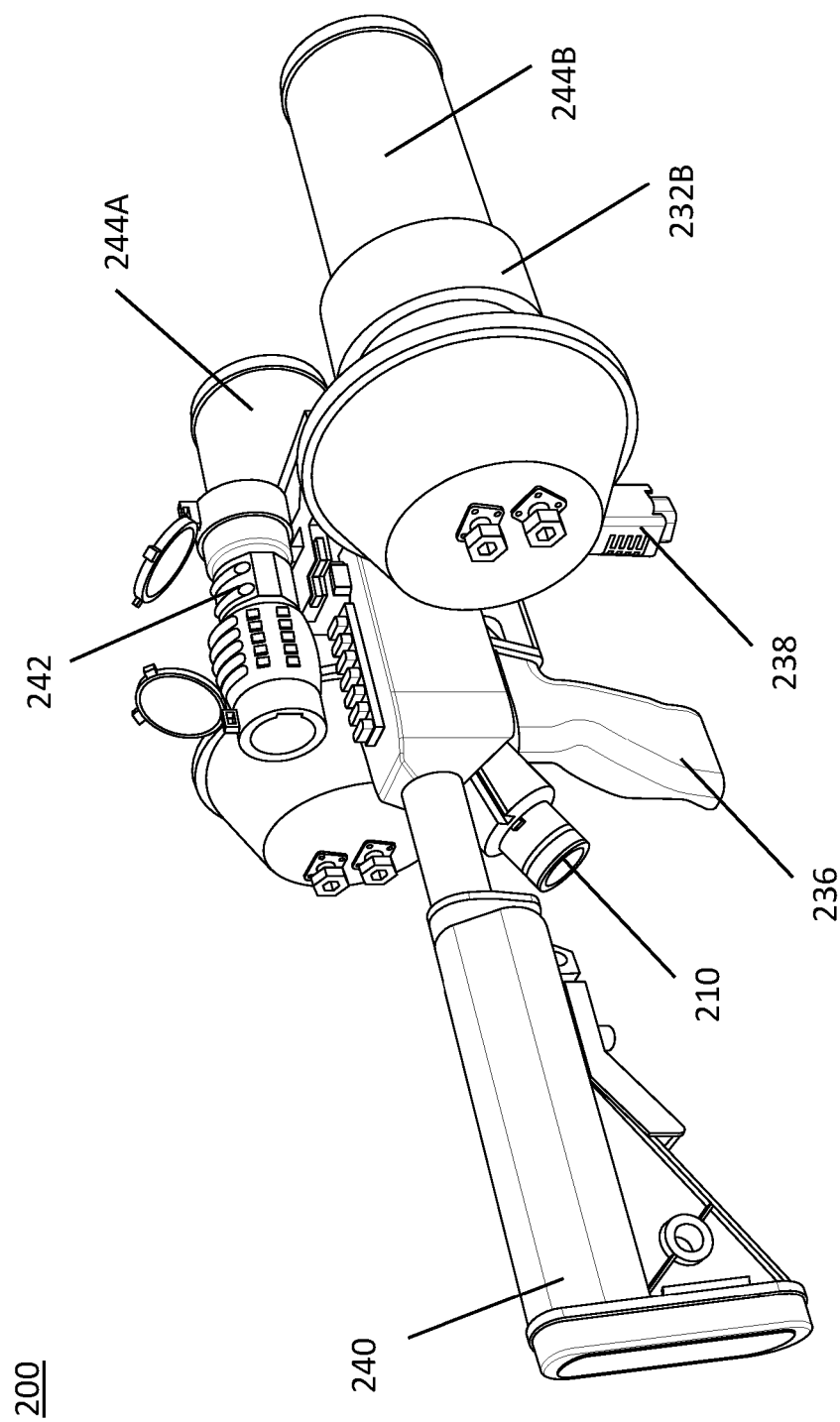
FIG. 10 shows the platform of the second embodiment with an antenna array mounted and having stabilising components mounted to configure the platform for portable use.

In the platform 200 configuration shown in FIG. 10, a pistol-type hand-grip 236 is mounted to the rear component interface 212, and a fore-grip 238 is mounted to the front component interface 214. As discussed above, by mounting this type of "hand-held" stabilising component 236, 238, the platform 200 is thereby configured for portable use. The platform 200 also has mounted to it twin detachable RF antennas mounted, an optical accessory 242 and a support component 240 in the form of a shoulder butt.

Figure 11B:
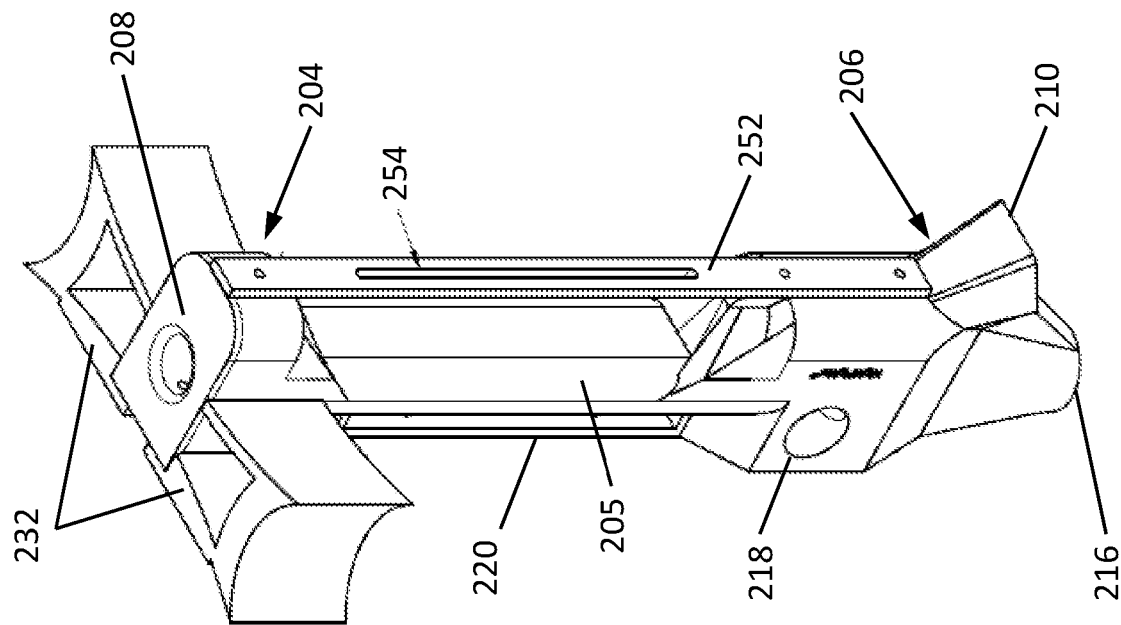
FIGS. 11A and 11B show the platform of the second embodiment having a stabilising component mounted to configure the platform for non-portable use.
Figure 11A:
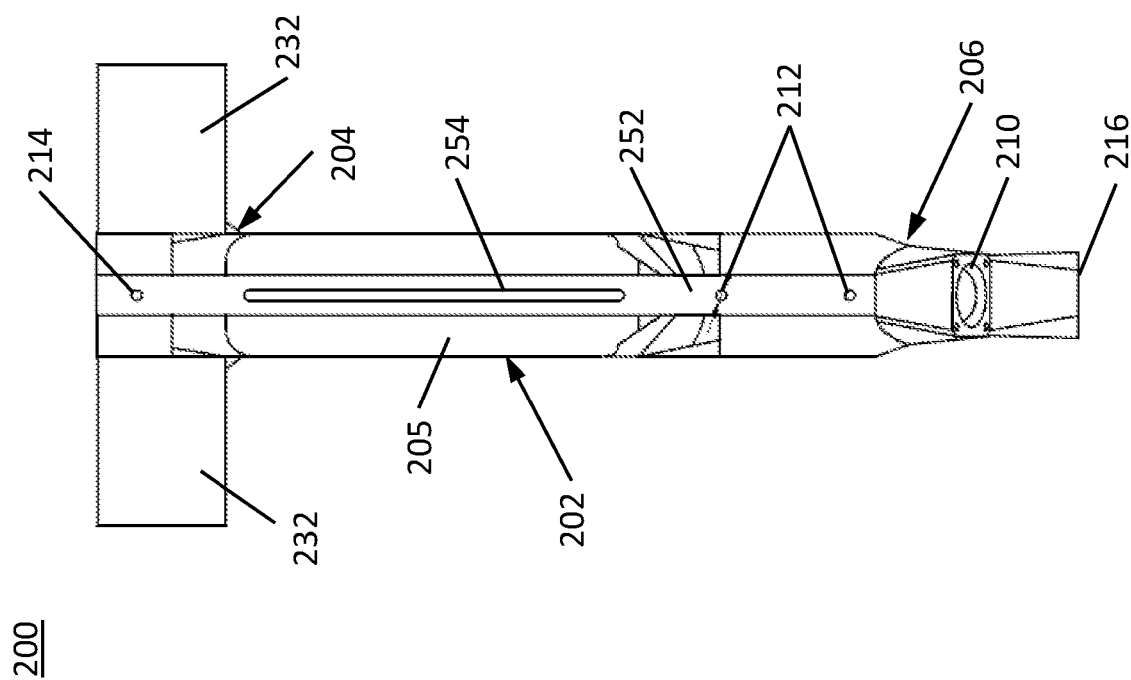

FIG. 11 shows the platform 200 of the second embodiment with another type of stabilising component 252 attached to the first and second component interfaces 212, 214, in place of the "hand-held" type of stabilising components 236, 238 shown in the configuration of FIG. 10. The stabilising component 252 here is a mounting plate for mounting the platform 200 to a static fixture, such as an optical array (not shown). The mounting plate 252 is elongate, such that it extends between the first and second component interfaces 212, 214. The mounting plate 252 is also provided with securing holes that are arranged to line up with the screw holes in the first and second component interfaces 212, 214, such that the mounting plate 252 can be screwed onto the body 202.

The mounting plate 252 is provided with a slot 254 that extends substantially the length of the mounting plate 252, though not right to the ends. The slot 254 may be used for securing the mounting plate 252, and hence the platform 200, to a static fixture. As discussed above, by mounting this type of "static" stabilising component 252, the platform 200 can be thereby configured for non-portable use, as illustrated in FIG. 12.

Figure 12B:
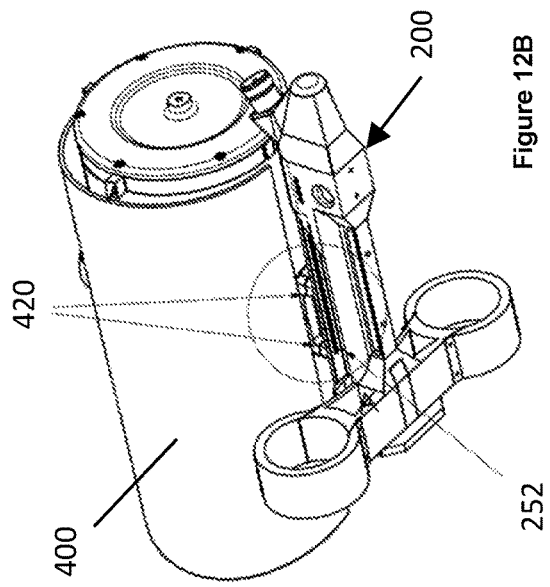
FIGS. 12A to 12D show the platform according to the second embodiment in a non-portable configuration mounted to a static fixture comprising an optical array.
Figure 12D:
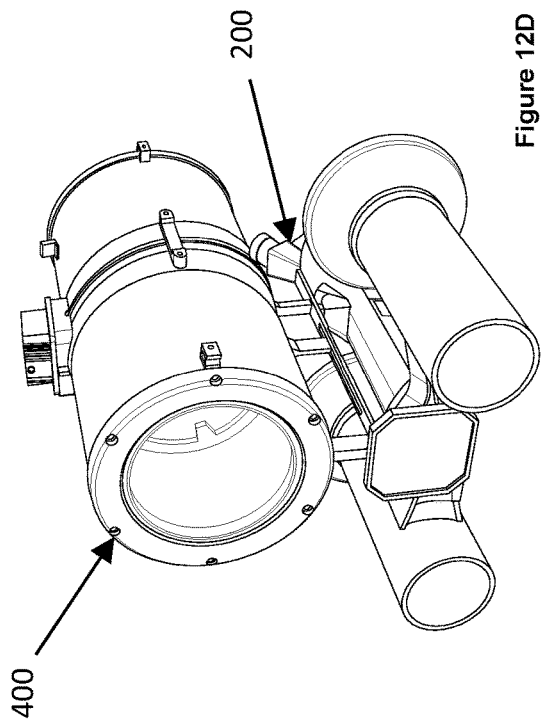
Figure 12A:
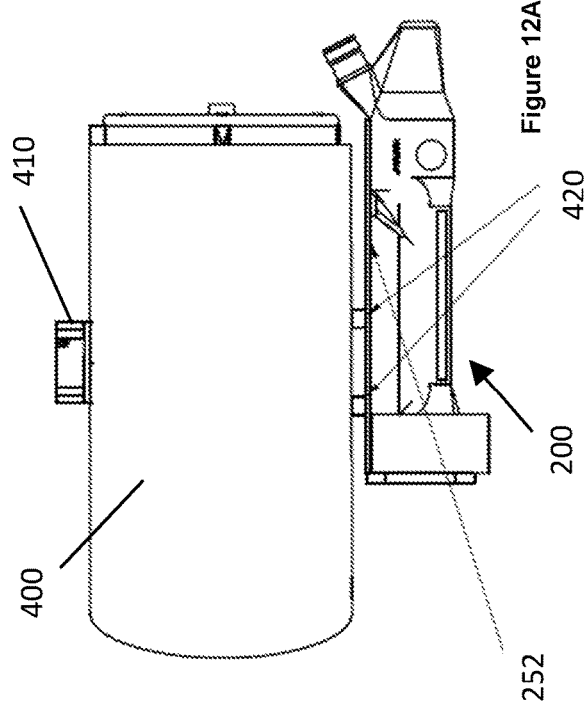
Figure 12C:
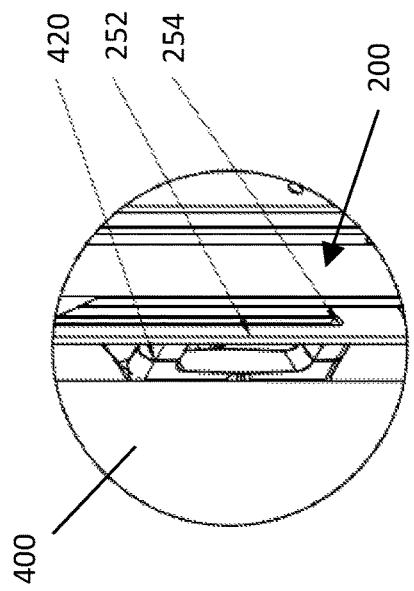
Figure 14B:
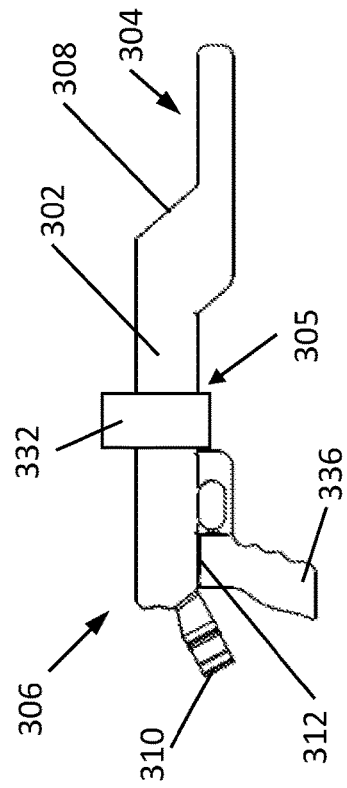
FIGS. 14A to 14D show an RF antenna platform according to a third embodiment of the present invention.
Figure 14A:
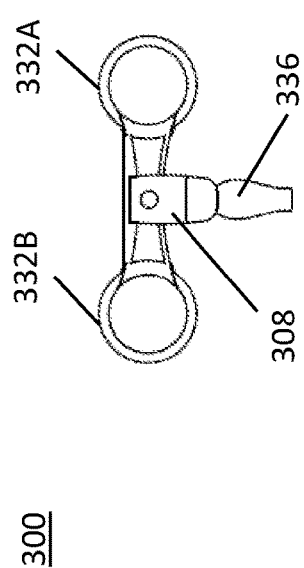
Figure 14D:
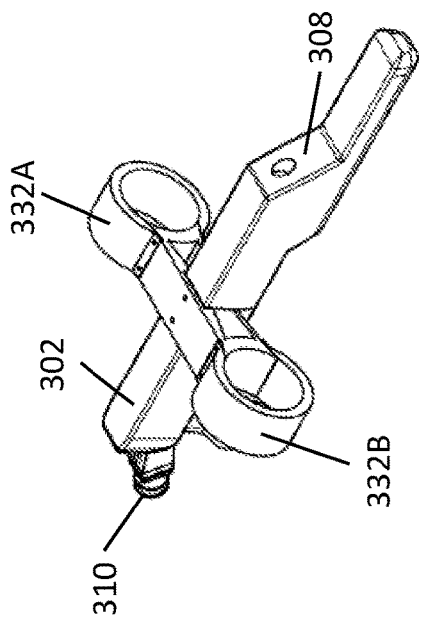
Figure 14C:
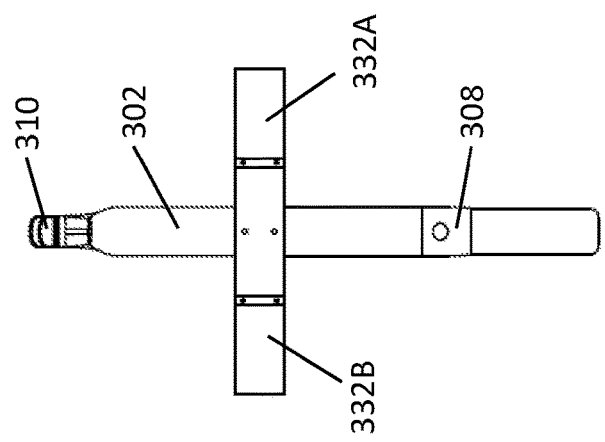
Figure 15:
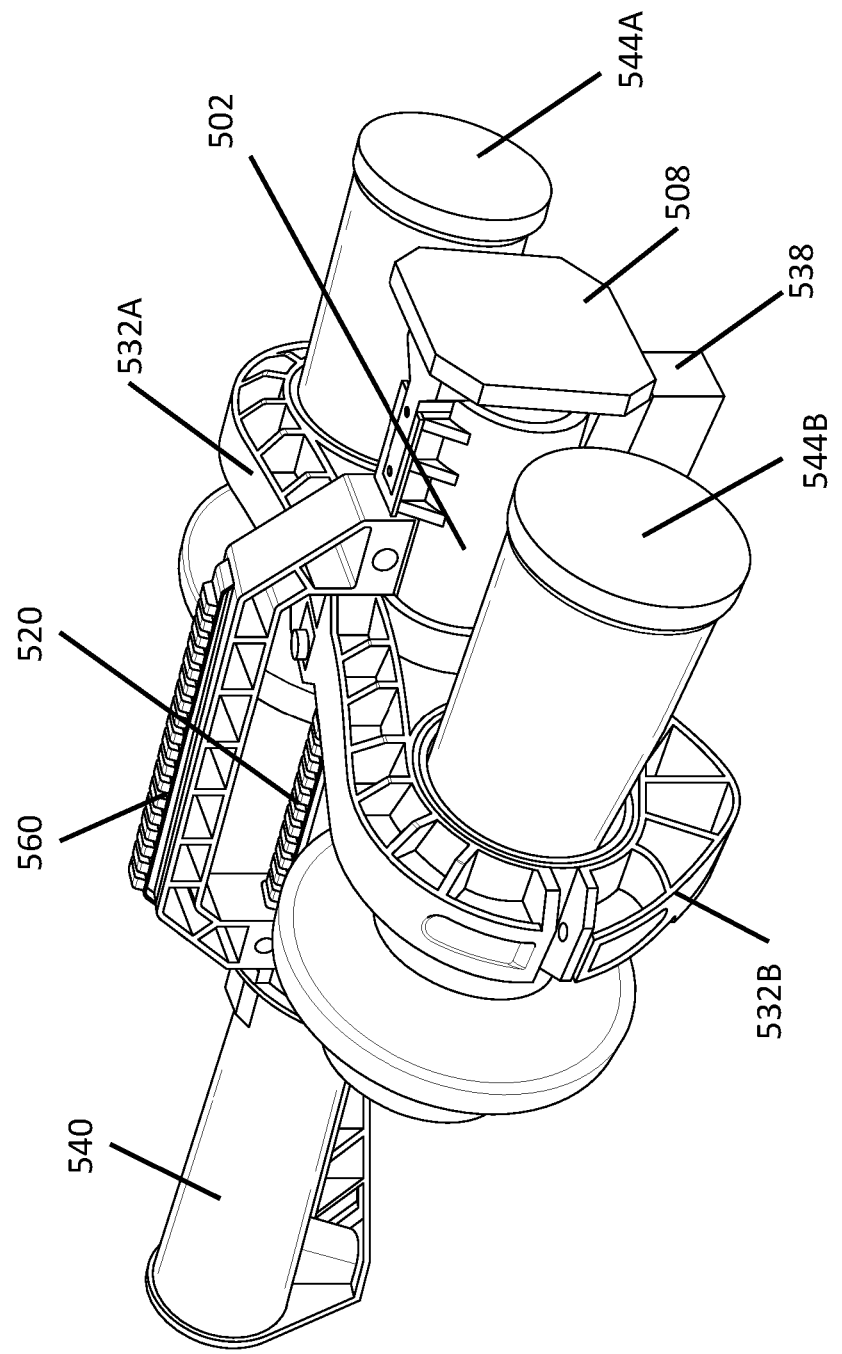
FIG. 15 shows an RF antenna platform according to a fourth embodiment of the present invention.
Figure 16:
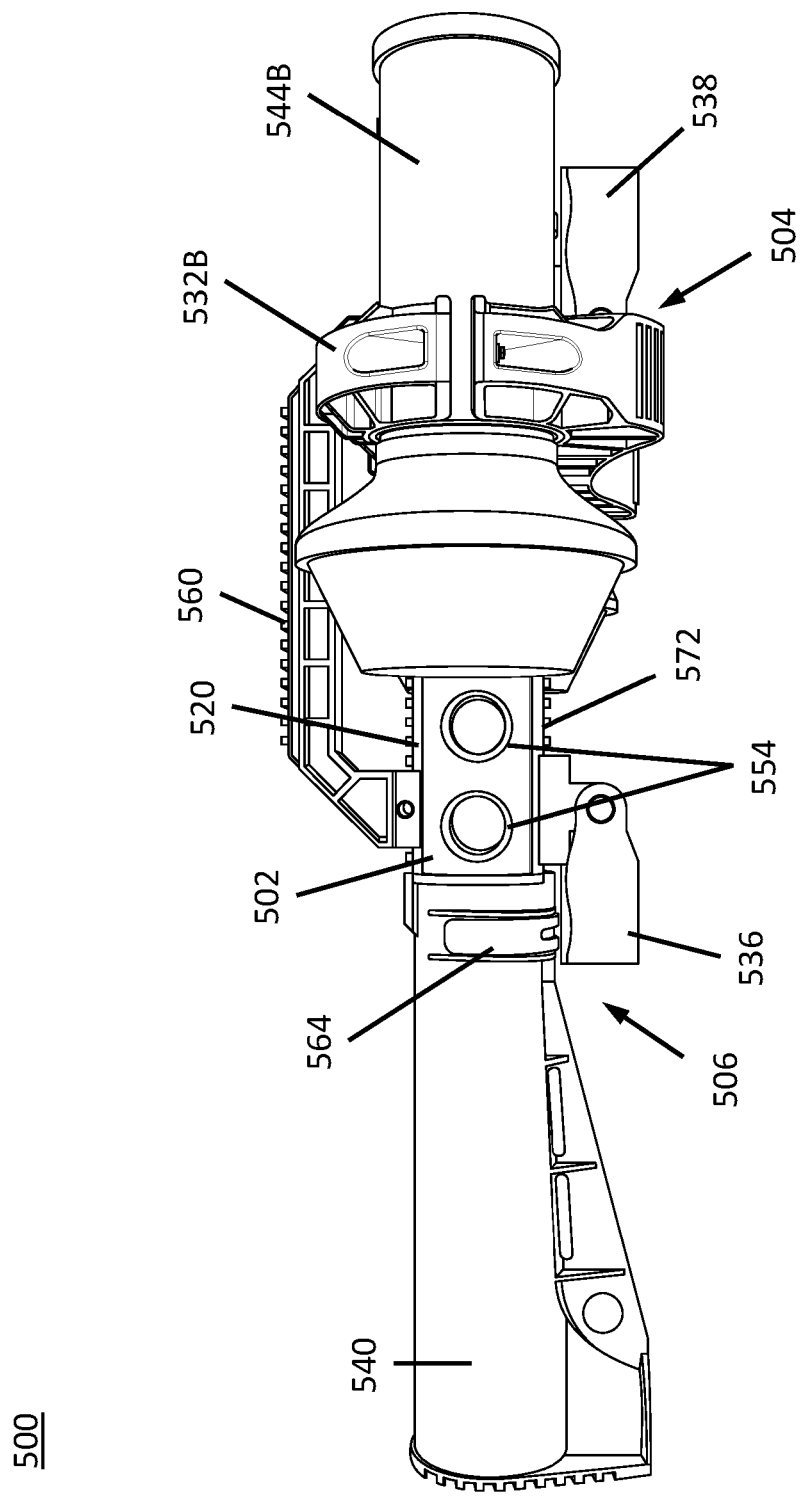
FIG. 16 shows a side-view of the platform according to the fourth embodiment.
Figure 17:
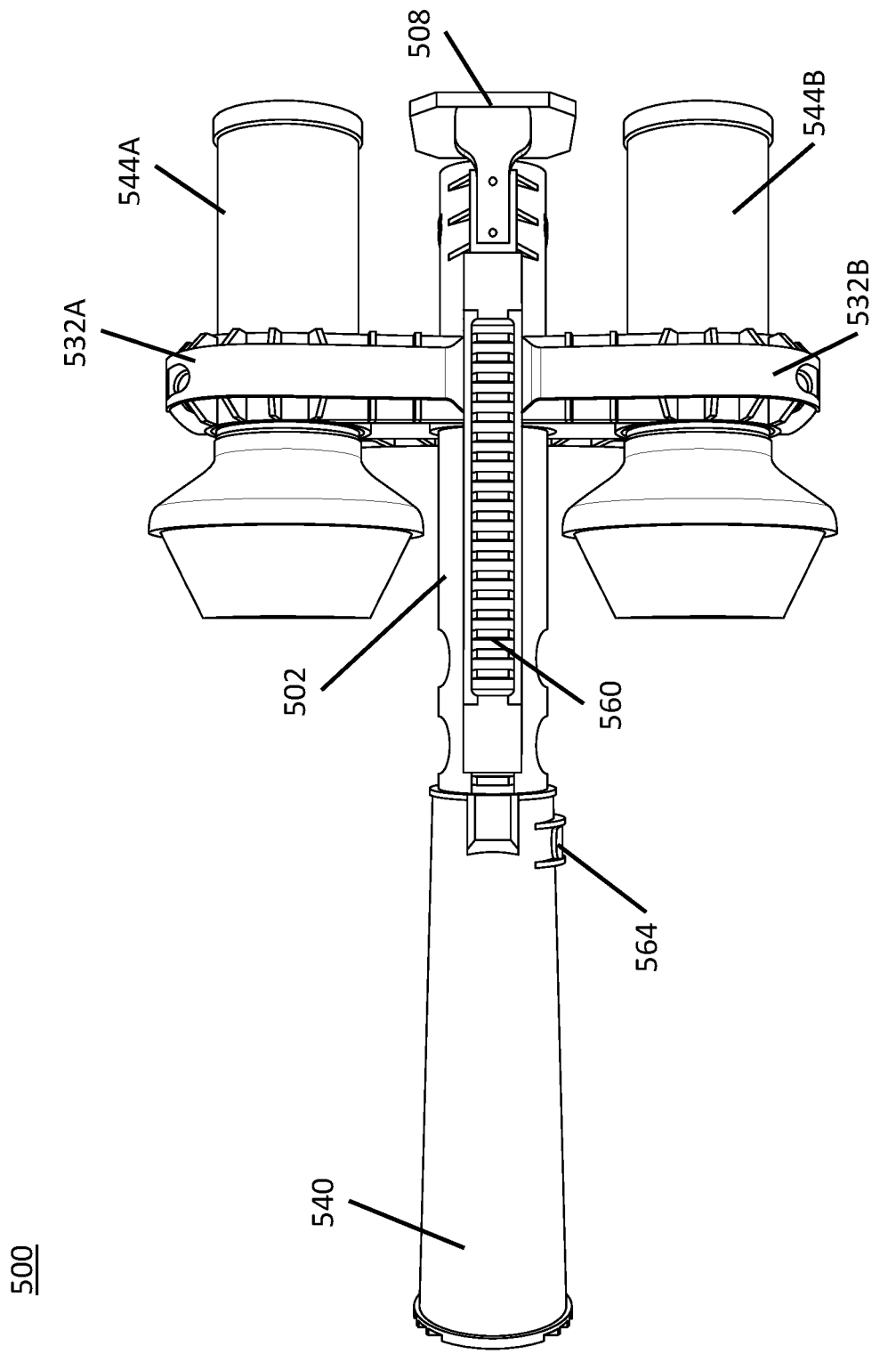
FIG. 17 shows a plan-view of the platform according to the fourth embodiment.
Figure 18:
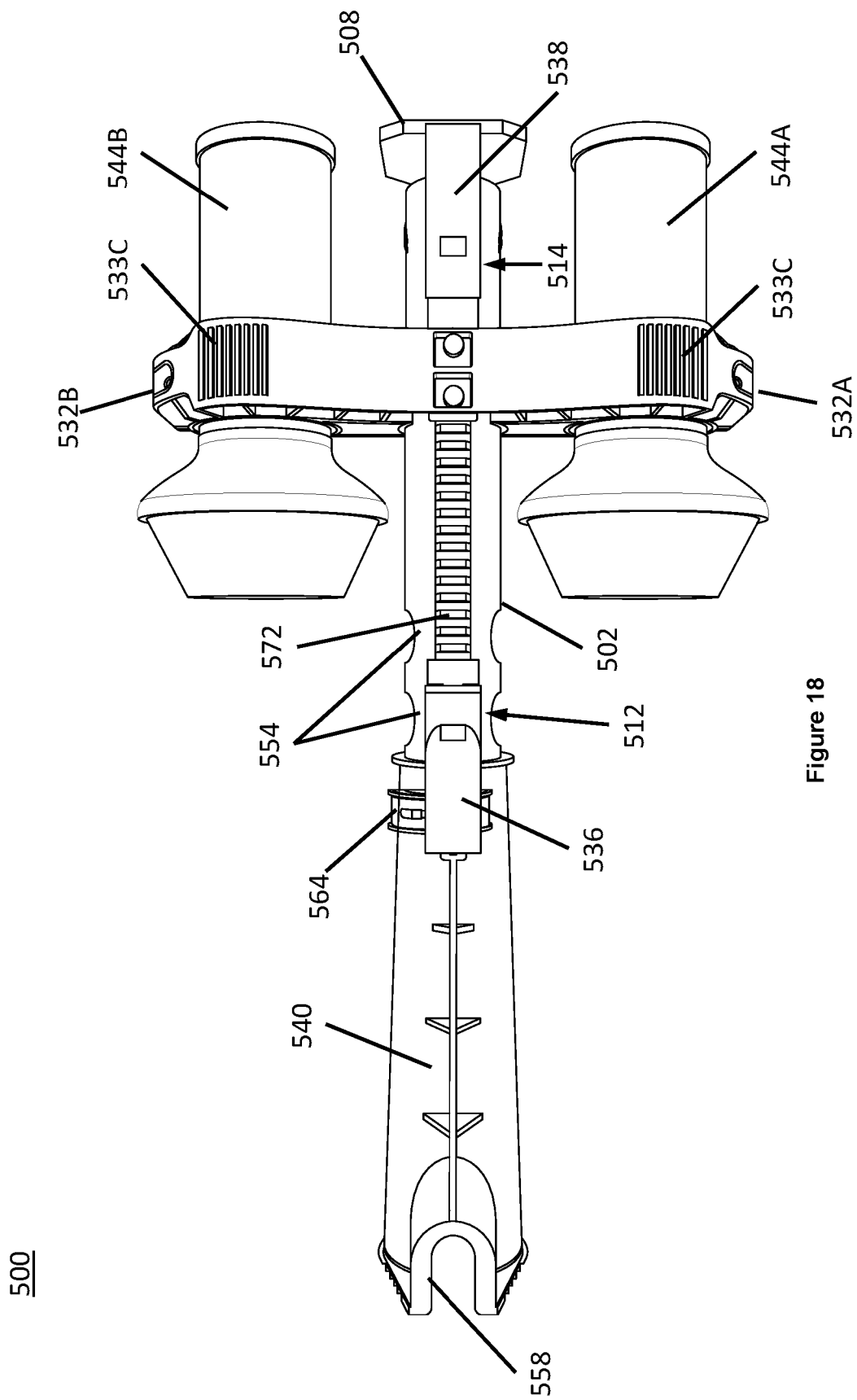
FIG. 18 shows an underside view of the platform according to the fourth embodiment.
Figure 19:
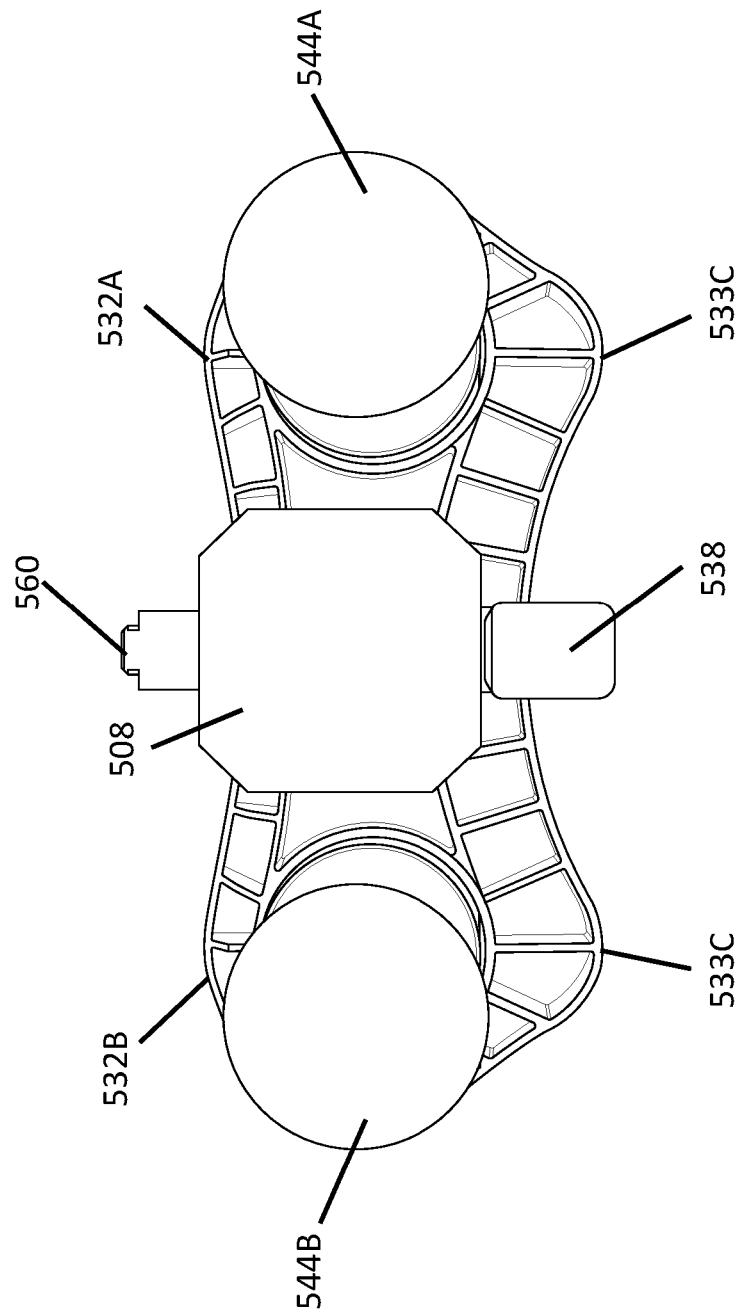
FIG. 19 shows a front-end view of the platform according to the fourth embodiment.

FIGS. 12A to 12C show a static fixture comprising an optical array 400, which may be attached to a building or other suitable structure. The optical array 400 may be a pan-and-tilt electro-optical array, and is preferably rotatable so as to provide a rotatable mount for the platform 200.

The platform 200 can be secured to the optical array 400 via the mounting plate 252. In this instance, the platform 200 is secured to the optical array by way of two mounting bolts (e.g. M4 Allen key bolts), which pass through the slot 245 of the mounting plate 252 and are received by correspondingly threaded holes provided in one or more mounting receptacles 420 of the optical array 400 (e.g. built into the housing of the optical array 400), as can clearly be seen in FIGS. 12A and 12B. FIG. 12C shows a close-up view of the mounting plate 252 in engagement with the mounting receptacles 420 of the optical array 400, with the mounting bolts removed, so that it can be seen how the slot 254 in the mounting plate 252 is aligned with the mounting receptacles 420 and the holes for receiving the mounting bolts provided therein.

The platform 200 is mounted to the optical array 400 such that the fixed RF antenna 208 and the twin helical RF antennas 244 (in this particular configuration) are facing in the same direction as the optical array 400 (i.e. forward-facing for threat detection), as can be seen in FIG. 12D. In use, the data interface 210 is coupled to a control unit, preferably which is integrated with the control unit of the optical array to provide a combined control system.

Similarly, FIGS. 13A to 13C show the platform 100 of the first embodiment having a stabilising component, again in the form of a mounting plate 152, secured to the first and second component interfaces 112, 114. As with the arrangement of FIG. 12, the platform 100 is secured to the "static fixture" of an optical array 400 via the mounting plate 152 being secured, by way of suitable mounting bolts, to mounting receptacles 420 provided on the optical array 400, as can be seen in FIGS. 13B and 13C. As such, the platform 100 is configured for non-portable use.

In the embodiment shown in both FIGS. 12 and 13, the optical array 400 may comprise an ODIN connection 410 for connecting the optical array 400 to an ODIN attitude control system for high accuracy three-axis stabilised control of the optical array 400, for example using gyros as primary sensors. Rotation of the optical array 400 may therefore be motorised. In addition, or alternatively, rotation of the optical array 400 may be automated and/or remotely controlled. As mentioned above, control of the platform may be integrated into the control system of the optical array 400.

FIGS. 14A to 14D shows a third embodiment of an RF antenna platform 300. The platform 300 comprises a body 302 having an RF antenna 308 and a component interface 312 to which is attached a stabilising component 336 in the form of a pistol-type hand-grip, thereby configuring the platform 300 for portable use. A data interface 310 is provided at the rear end 306 of the body 302. This platform 300 is, again, for use with low gain (short) detachable RF antennas and therefore only a single antenna mount 332 is provided for mounting detachable RF antenna to the platform 300. The antenna mount 332 is provided towards the mid-section 305 of the body 302.

FIGS. 15 to 19 show various views of a fourth embodiment of an RF antenna platform 500. As with the previous embodiments, the platform 500 comprises a body 502 having an RF antenna 508 and first and second component interfaces 512, 514 provided towards the rear end 506 and front end 504, respectively, of the body 502. The RF antenna 508 shown is a flat panel antenna.

Attached to each of the component interfaces 512, 514 are stabilising components 536, 538 in the form of folding hand-grips, similar to conventional "fore-grips". The folding hand-grips 536, 538 facilitate stability when the platform 500 is being held in "portable" use with the hand-grips 536, 538 in an extended configuration. When the hand-grips 536, 538 are in a folded configuration, they tuck out the way such that the platform 500 can rest on "feet" elements provided by the antenna clamps 532A, 532B (as will be discussed further on) thus affording the platform 500 a low centre of gravity and enhanced stability, for example when on a substantially flat, e.g. horizontal, surface. In their folded configuration, the hand-grips 536, 538 are arranged to extend substantially parallel along the length of the body 502 of the platform 500, with their free (i.e. unattached ends) pointing towards the front end 504 of the body 502, where the RF antenna 508 is situated.

Figure 20:
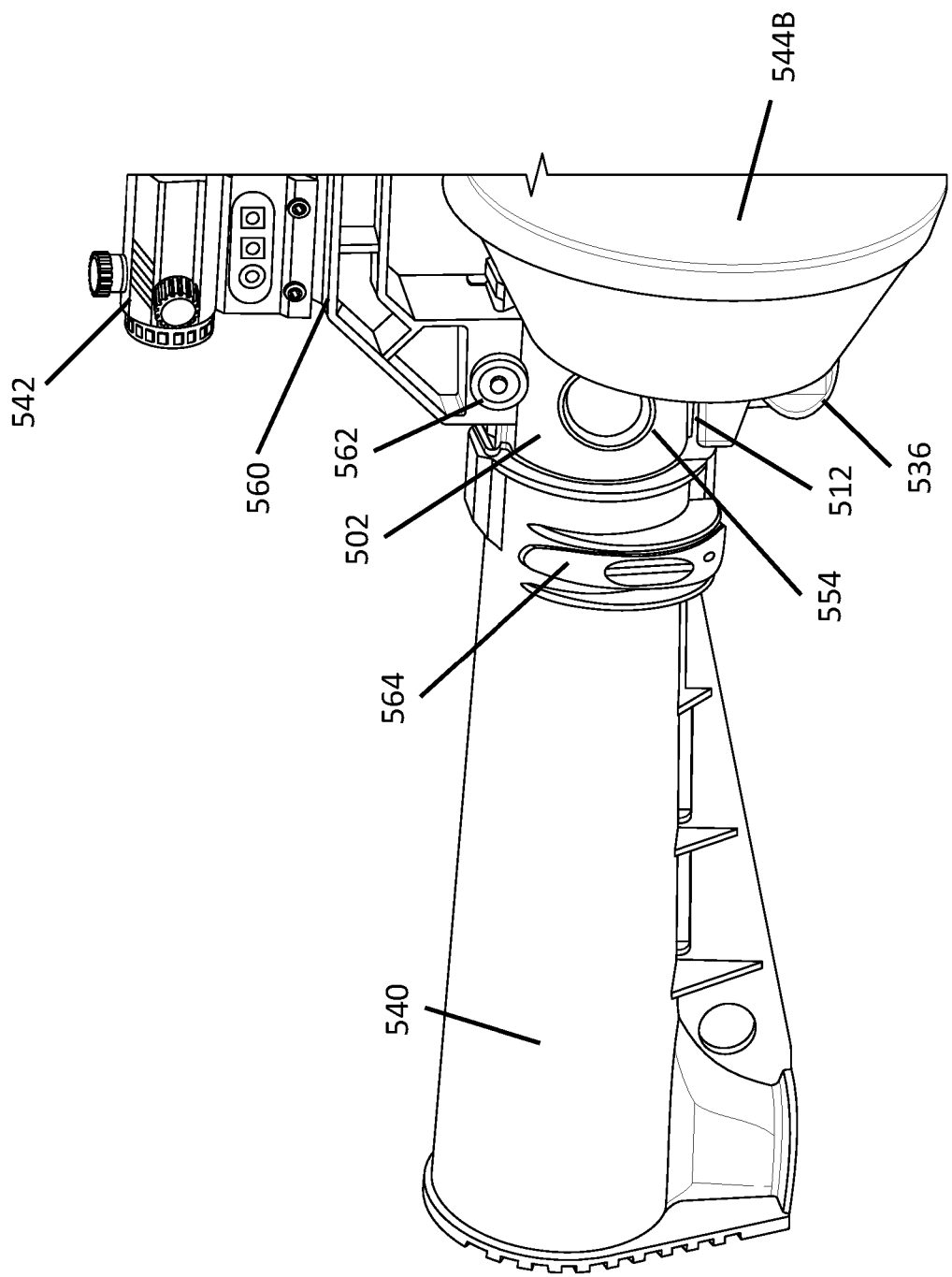
FIG. 20 shows the rear end of the platform according to the fourth embodiment.

An attachment mount or rail 520 is provided on the body 502, for example a Picatinny rail or a Weaver rail. In addition, a carry-handle 560 is attached to the body 502, above the attachment rail 520. The handle 560 may be secured to attachment rail 520 of the body 502 using two fasteners 562 provided one at each end of the handle 560. The upper surface of the handle 560 is also configured as an attachment mount or rail, and an optical accessory 542, such as an optical sight, may be mounted thereto. These features are shown in FIG. 20 and/or FIG. 21.

The stabilising components (e.g. folding hand-grips) 536, 538 are mounted to the body 502 via an attachment mount or rail 572 (e.g. a Picatinny rail or Weaver rail) located on the underside of the body 502, which provides component interfaces 512, 514 for the stabilising components 536, 538 on the platform 500. This attachment rail is similar to the attachment rail 520 provided on the upper side of the body 502.

The platform has a substantially hollow, cylindrical body 502. One or more ports 544 are provided for the ingress and egress of RF cabling 556 between detachable RF antennas 544 mounted to the platform 500 and a data interface 510 provided on the body 502 for electrical connection to a separate control unit (not shown), wherein the RF cabling 556 passes through a hollow portion of the body 502 via a port 544. Further RF cabling (not shown) is provided inside the body 502 to connect the data interface 510 and the RF antenna 508 mounted at the front end 504 of the body 502. The cabling 556, 566 is, preferably, electromagnetically shielded cabling.

Figure 21:
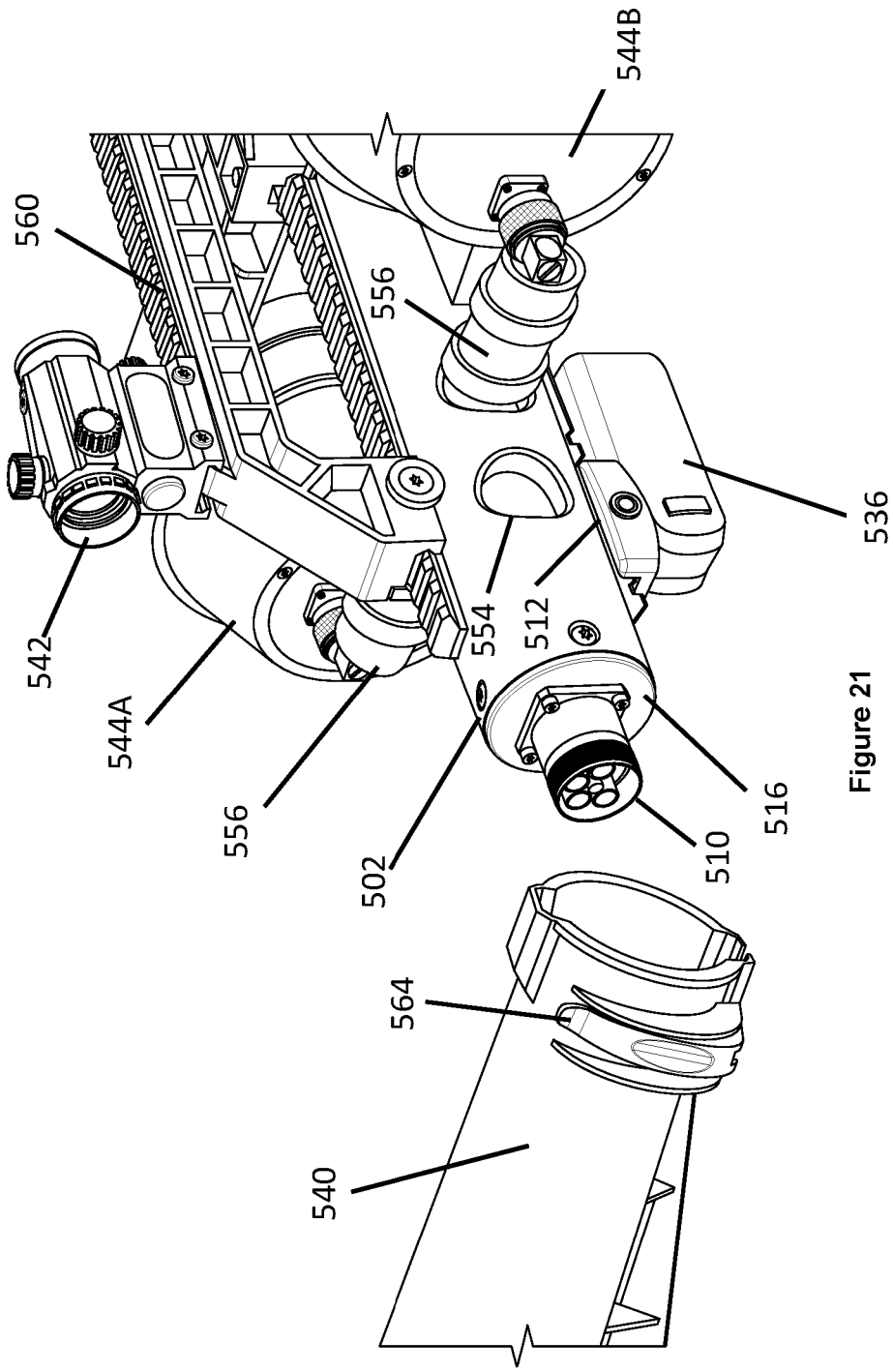
FIG. 21 shows a data interface of the platform according to the fourth embodiment.

The data interface 510 is provided at the rear end 506 of the body 502. As shown in FIGS. 20 and 21, the platform 500 comprises a detachable support component 540 (e.g. a shoulder butt) mounted to a support mount 516 at the rear end 506 of the body 502. The shoulder butt 540 may be secured to the body 502 by way of a quick-release clamp 564, as shown, or screw fasteners 562 similar to those which secure the carry handle 560 to the body 502. The platform 500 can of course be operated with or without the shoulder butt 540 mounted to the body 502.

The data interface 510 can be seen in FIG. 21, where the shoulder butt 540 has been detached from the body 502. One or more ports 554 may be provided through the side of the body 502 for the RF cabling 556 between the RF antennas 544 and the data interface 510. A plurality of ports 554 may be provided along the side of the body 502 to accommodate detachable RF antennas 544 of different lengths. The rear folding hand-grip 536 (i.e. stabilising component) can also be seen in this figure.

FIG. 22A shows the connection between external RF cabling 566, from a separate control unit (not shown), and the data interface 510 via a connector plug 568, which may be configured to provide an interference push-fit connection for quick-release. FIG. 22B shows a data interface 610 of a separate control unit 600, which data interface 610 corresponds with the data interface 510 of the platform 500. As can be seen, the data interfaces 510, 610 are configured as 5-in-1 RF connectors to allow for more than one channel for RF signals to be transmitted to the RF antennas 508, 544 on the platform 500, which preferably are configured to transmit different effector frequencies.

As shown in FIG. 23, the shoulder butt 540 is substantially hollow such that the external RF cabling 566 from a separate control unit (not shown) can be fed through the shoulder butt 540 to electrically connect the control unit, via a connector plug (not shown) to the data interface 510 of the platform 500, and hence the RF antennas 508, 544 mounted to the platform 500 via the internal RF cabling 556. The end face of the shoulder butt 540 exhibits a slot 558 (here a "key-shaped" slot), which ideally extends partially around the underside of the shoulder butt 540 to allow the external RF cabling 566 to bend out of the way, within the minimum bend radius of the cabling 566, whilst the shoulder butt 540 is in contact with a user's shoulder. The shoulder butt 540 may further comprise a plurality of internal ribs (not shown), spaced around the inside of the shoulder butt 540, to provide additional structural strength. Additionally, or alternatively, the shoulder butt 540 may comprise a strengthening rib member extending at least a portion of its external length, preferably on the underside of the shoulder butt 540, and one or more transversely orientated fins that join the rib member to the shoulder butt 540, as shown in FIG. 20.

Figure 24:
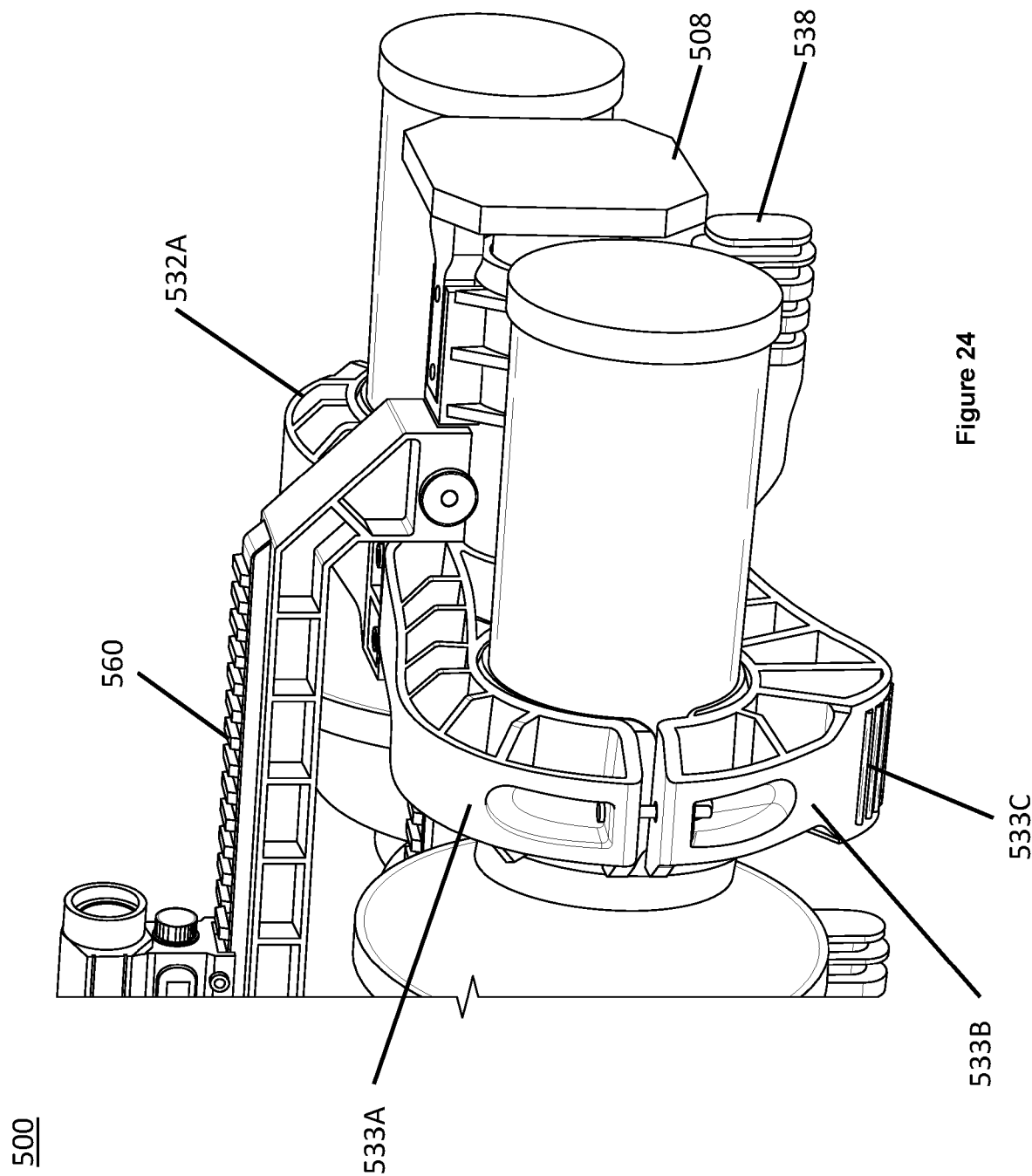
FIG. 24 shows the antenna mounts of the platform according to the fourth embodiment.

The platform 500 further comprises antenna mounts 532 in the form of antenna clamps 532A, 532B that secure two detachable RF antenna 544A, 544B to the body 502. The antenna clamps 532A, 532B are arranged to clamp around each of the detachable RF antenna 544A, 544B, circumferentially, and may therefore comprise upper and lower portions 533A, 533B that are fastened together using a suitable fastener, such as a screw fastener, for example, to retain the detachable RF antennas 544. As mentioned above, and better shown in FIG. 24, the lower portions 533B of each antenna clamp 532A, 532B may be configured to provide feet elements 533C upon which the platform 500 may rest when no stabilising components are attached to the body 502, or when the folding hand-grips 536, 538 shown attached to the body 502 are in their folded configuration.

Figure 25:
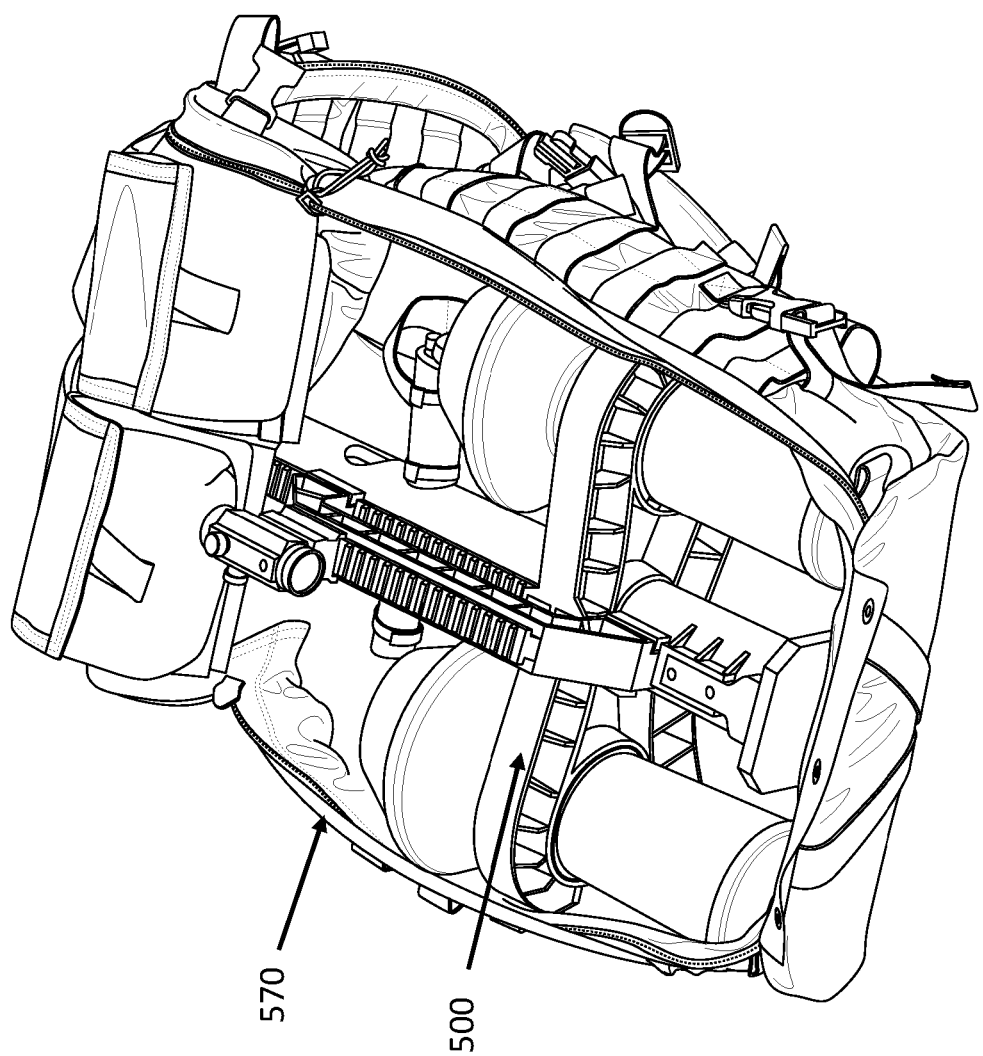
FIG. 25 shows an example of a carry bag containing an RF antenna platform in compact form.

By removing or folding the stabilising components (e.g. folding hand-grips) 536, 538 and the support mount (e.g. shoulder butt) 540 from the platform body, the platform 500 can be made quite compact for transportation. As shown in FIG. 25, the platform 500 may be packed into a suitable carry bag 570. This may further provide the advantage of concealing the platform 500 during use, as its operation is not affected by being contained in a carry bag 570. The platform 500 can of course be mounted to an optical array 400 comprising an ODIN connection 410, or similar, in a non-portable configuration, preferably via the attachment mount or rail 572 located on the underside of the body 502, similar to what has been described for the previous embodiments.

It will be understood by a skilled person that the present invention has been described above purely by way of example, and modifications of detail can be made within the scope of the invention. For example, any feature in a particular aspect or embodiment described herein may be applied to another aspect or embodiment, in any appropriate combination. It should also be appreciated that particular combinations of the various features described and defined in any aspects or embodiments described herein can be implemented and/or supplied and/or used independently. Thus, while the foregoing is directed to exemplary aspects and embodiments of the present invention, other and further aspects and embodiments of the invention will be apparent to those skilled in the art from consideration of the specification, and may be devised without departing from the basic scope thereof, which is determined by the claims that follow.

The invention claimed is:

1. An electronic counter measure RF antenna platform selectively configurable for portable or non-portable use, the platform comprising:
   a body comprising at least one fixed RF antenna for transmitting and receiving RF signals;
   at least one component interface rail provided on the body for interchangeable mounting of different types of stabilising component to the body to selectively determine portable and non-portable configurations of the platform;
   at least one antenna mount arranged to mount to the at least one component interface rail at least one detachable RF antenna configured to transmit RF signals; and,
   a data interface for connecting the RF antennas to a separate control unit that supplies RF signals, wherein the data interface is in data communication with the RF antenna via cabling disposed within an internal conduit through the body.

2. The platform of claim 1, wherein said different types of stabilising component include a hand-grip for configuring the platform for portable use, for example a pistol-type hand-grip.

3. The platform of claim 1, wherein said different types of stabilising component include a static fixture for configuring the platform for non-portable use.

4. The platform of claim 1, wherein said different types of stabilising component include a rotatable mount for configuring the platform for non-portable use, preferably said rotatable mount being attached to a static fixture such as a building or vehicle, for example wherein rotation of the rotatable mount is motorised.

5. The platform of claim 1, wherein said different types of stabilising component include a mounting plate for configuring the platform for non-portable use, for example wherein the mounting plate is adapted for mounting the platform to a static fixture and/or wherein the mounting plate has a slot for receiving fixings of the static fixture.

6. The platform of any claim 1, wherein the body is elongate having a first end and a second end.

7. The platform of claim 1, wherein said at least one component interface rail is a first component interface rail, the platform further comprising a second component interface rail for interchangeable attachment of said different types of stabilising component.

8. The platform of claim 1, wherein the body is further configured for attachment of a support component for supporting the platform on part of an operator's body, for example a shoulder butt.

9. The platform of claim 1, further comprising at least one of said stabilising components removably mounted to said at least one component interface rail.

10. The platform of claim 1, wherein said at least one fixed RF antenna is configured as a flat panel RF antenna.

11. The platform of claim 1, wherein said at least one fixed RF antenna is integral with the body.

12. The platform of claim 1, wherein the data interface comprises a 5-in-1 connector arrangement such that five data cables can be connected to the platform for data communication with the RF antennas via said single connector.

13. The platform of claim 1, wherein at least part of the body is hollow.

14. The platform of claim 1, wherein the cabling is electromagnetically shielded cabling (EMC), preferably wherein the cabling is substantially contained within the body.

15. The platform of claim 1, wherein the at least one detachable RF antenna forms an antenna array with said at least one fixed RF antenna.

16. The platform of claim 1, wherein said at least one antenna mount is arranged to mount to the body at least two detachable RF antennas configured to transmit RF signals.

17. The platform of claim 1, wherein said at least one antenna mount comprises first and second antenna mounts for mounting the or each detachable RF antenna, wherein the first and second antenna mounts are spaced apart along the body such that said one or more detachable RF antenna is supported by both the first and second antenna mounts.

18. The platform of claim 1, further comprising at least one RF connector port provided in the body and coupled with the communication interface, wherein the at least one RF connector port is further arranged to be coupled to the at least one detachable RF antenna for communication of RF data therebetween.

19. The platform of claim 1, wherein the at least one component interface rail is a Picatinny rail or a Weaver rail.

20. A kit of parts, comprising:
   an electronic counter measure RF antenna platform according to claim 1;
   at least one detachable RF antenna mountable to the platform;
   an optical accessory that is mountable to the platform; and,
   at least one stabilising component that is mountable to the platform.

* * * * *